US008535830B2

(12) United States Patent
Lee et al.

(10) Patent No.: US 8,535,830 B2
(45) Date of Patent: Sep. 17, 2013

(54) HIGH-POWERED ELECTROCHEMICAL ENERGY STORAGE DEVICES AND METHODS FOR THEIR FABRICATION

(75) Inventors: Sang Bok Lee, Clarksville, MD (US); Ran Liu, Beltsville, MD (US); Seungil Cho, Rockville, MD (US)

(73) Assignee: The University of Maryland, College Park, College Park, MD (US)

( * ) Notice: Subject to any disclaimer, the term of this patent is extended or adjusted under 35 U.S.C. 154(b) by 549 days.

(21) Appl. No.: 12/747,942

(22) PCT Filed: Dec. 9, 2008

(86) PCT No.: PCT/US2008/086025
§ 371 (c)(1),
(2), (4) Date: Jun. 17, 2010

(87) PCT Pub. No.: WO2009/123666
PCT Pub. Date: Oct. 8, 2009

(65) Prior Publication Data
US 2010/0266897 A1    Oct. 21, 2010

Related U.S. Application Data

(60) Provisional application No. 61/014,952, filed on Dec. 19, 2007.

(51) Int. Cl.
*H01M 4/13* (2010.01)
*H01M 4/50* (2010.01)
*H01M 4/34* (2006.01)
*H01M 4/54* (2006.01)
*H01M 10/32* (2006.01)

(52) U.S. Cl.
USPC .......................... 429/224; 429/219

(58) Field of Classification Search
None
See application file for complete search history.

(56) References Cited

U.S. PATENT DOCUMENTS 7,084,002 B2    8/2006    Kim et al.
7,342,708 B2    3/2008    Ho et al.

FOREIGN PATENT DOCUMENTS

WO    WO 2009123666    10/2009

OTHER PUBLICATIONS

Kovtyukhova et al, Nanowire p-n Heterojunction Diodes Made by Templated Assembly of Multilayer Carbon-Nanotube/Polymer/Semiconductor-Particle Shells around Metal Nanowires, 187-192 Adv. Mat'l. 17 (2005)).*
Ahonen et al. (2000) "*n- and p-Doped Poly(3,4-ethylene dioxythiophene): Two Electronically Conducting States of the Polymer*," Macromolecules 33:6787-6793.
An et al. (2001) "*Supercapacitors Using Single-Walled Carbon Nanotube Electrodes*," Adv. Mater. 13:497-500.
Arbizzani et al. (2001) "*New Trends in Electrochemical Supercapacitors*," J. Power Sources 100:164-170).

(Continued)

*Primary Examiner* — Patrick Ryan
*Assistant Examiner* — Yoshitoshi Takeuchi
(74) *Attorney, Agent, or Firm* — William C. Schrot; Jeffrey I. Auerbach; The Auerbach Law Firm, LLC

(57) ABSTRACT

The present invention relates to electrochemical storage devices, such as supercapacitors, batteries, etc., and more particularly to such devices that comprise an electrochemically active coaxial nanowire. The invention particularly concerns such devices in which the coaxial nanowire comprises an inner core of a transition metal oxide and an axially surrounding outer shell composed of an electroconductive organic polymer, such as poly(3,4-ethylenedioxythiophene) (PEDOT). The invention particularly relates to a facile method for achieving the self-assembly of such coaxial nanowires.

12 Claims, 13 Drawing Sheets

(56) References Cited

OTHER PUBLICATIONS

Arico, A.S. et al. (2005) "Nanostructured Materials for Advanced Energy Conversion and Storage Devices," Nat. Mater. 4:366-377.
Bae, C. et al. (2008) "Template-Directed Synthesis of Oxide Nanotubes: Fabrication, Characterization, and Applications," Chem. Mater. 20(3):757-767.
Bélanger et al. (2000) "Characterization and Long-Term Performance of Polyaniline-Based Electrochemical Capacitors," J. Electrochem. Soc. 147:2923-2929.
Burke, A. (2000) "Ultracapacitors: Why, How, and Where Is the Technology," J. Power Sources 91:37-50.
Cai et al. (1992) "Electrochemical Investigations of Electronically Conductive Polymers VII. Charge Transport in Lightly Doped Polypyrrole," Synth. Met. 46:165-179.
Cao, Y. et al. (2008) "Morphology of Template-Grown Polyaniline Nanowires and Its Effect on the Electrochemical Capacitance of Nanowire Arrays," Chem. Mater. 20(16):5260-5265.
Carlberg et al. (1997) "Poly(3,4-ethylenedioxythiophene) as Electrode Material in Electrochemical Capacitors," J. Electrochem. Soc. 144 L61-L64.
Chang, J.K. et al. (2003) "Material Characterization and Electrochemical Performance of Hydrous Manganese Oxide Electrodes for Use in Electrochemical Pseudocapacitors," J. Electrochem. Soc. 150:A1333-A1338.
Che et al. (1997) "Chemical-Vapor Deposition-Based Template Synthesis of Microtubular $TiS_2$ Battery Electrodes," J. Electrochem. Soc. 144:4296-4302.
Cho, S.I. et al. (2005) "Electrochemical Synthesis and Fast Electrochromics of Poly(3,4-ethylenedioxythiophene) Nanotubes in Flexible Substrate," Chem. Mater. 17:4564-4566.
Cho,S.I. et al. (2005) "Nanotube-Based Ultrafast Electrochromic Display," Adv. Mater. 17:171-175.
Conway et al. (1997) "The Role and Utilization of Pseudocapacitance for Energy Storage by Supercapacitors," J. Power Sources 66:1-14.
Desilvestro, J. et al. (1990) "Metal Oxide Cathode Materials for Electrochemical Energy Storage: A Review," J. Electrochem. Soc. 137:C5-C22.
Du et al. (2005) "High Power Density Supercapacitors Using Locally Aligned Carbon Nanotube Electrodes," Nanotechnology 16:350-353.
Fan, H.J. et al. (2006) "Monocrystalline Spinel Nanotube Fabrication Based on the Kirkendall Effect," Nat. Mater. 5:627-631.
Ferraris et al. (1998) "Performance Evaluation of Poly 3-(Phenylthiophene) Derivatives as Active Materials for Electrochemical Capacitor Applications," Chem. Mater. 10:3528-3535.
Fusalba et al. (2000) "Poly(Cyano-Substituted Diheteroareneethylene) as Active Electrode Material for Electrochemical Supercapacitors," Chem. Mater. 12:2581-2589.
Fusalba et al. (2001) "Electrochemical Characterization of Polyaniline in Nonaqueous Electrolyte and Its Evaluation as Electrode Material for Electrochemical Supercapacitors," J. Electrochem. Soc. 148:A1-A6.
Goodey, A.P. et al. (2007) "Silicon Nanowire Array Photoelectrochemical Cells," J. Am. Chem. Soc. 129:12344-12345.
Groenendaal, L.B. et al. (2000) "Poly(3,4-ethylenedioxythiophene) and Its Derivatives: Past, Present, and Future," Adv. Mater. 12:481.
Groenendaal, L.B. et al. (2003) "Electrochemistry of Poly(3,4-alkylenedioxythiophene) Derivatives," Adv. Mater. 15:855-879.
Gupta et al. (2005) "Electrochemically Deposited Polyaniline Nanowire's Network," Electrochem. Solid-State Lett.8:A630-A632.
Ha, Y.-H. et al. (2004) "Towards a Transparent, High Conductive Poly(3,4-ethylenedioxythiophene)," Adv. Funct. Mater. 14(6):615-622.
Heywang, G. (1992) "Poly(alkylenedioxythiophene)s—New, Very Stable Conducting Polymers," Adv. Mater. 4:116-118;.
Hu et al. (2003) "Nanostructures and Capacitive Characteristics of Hydrous Manganese Oxide Prepared by Electrochemical Deposition," J. Electrochem. Soc. 150:A1079-A1082.

Hu, C.C. et al. (2006) "Design and Tailoring of the Nanotubular Arrayed Architecture of Hydrous RuO2 for Next Generation Supercapacitors," Nano Lett. 6:2690-2695.
Ingram et al. (2004) "'ladder-Doped' Polypyrrole: A Possible Electrode Material for Inclusion in Electrochemical Supercapacitors?" J. Power Sources129:107-112.
Jang et al. (2006) "Selective Fabrication of Poly(3, 4-ethylenedioxythiophene) Nanocapsules and Mesocellular Foams Using Surfactant-Mediated Interfacial Polymerization," Adv. Mater. 18:354-358.
Ji, C.X. et al. (2002) "Fabrication of Nanoporous Gold Nanowires," Appl. Phys. Lett. 81:4437-4439.
Kim et al. (2002) "An All-Solid-State Electrochemical Supercapacitor Based on Poly3-(4-fluorophenylthiophene) Composite Electrodes," J. Electrochem. Soc. 149:A1376-A1380.
Kim,D.W. et al. (2007) "Highly Conductive Coaxial $SnO_2$—$In_2O_3$ Heterostructured Nanowires for Li Ion Battery Electrodes," Nano Lett. 7:3041-3045.
Kovtyukhova, N.L. et al. (2005) "Nanowire p-n Heterojunction Diodes Made by Templated Assembly of Multilayer Carbon-Nanotube/Polymer/Semiconductor-Particle Shells around Metal Nanowires," Adv. Mater. 17:187-192.
Laforgue et al. (2001) "Hybrid Supercapacitors Based on Activated Carbons and Conducting Polymers," J. Electrochem. Soc. 148:A1130-A1134.
Laforgue et al. (2003) "Activated Carbon/Conducting Polymer Hybrid Supercapacitors," J. Electrochem. Soc. 150:A645-A651.
Lauhon, L.J. et al. (2002) "Epitaxial Core-Shell and Core-Multishell Nanowire Heterostructures," Nature 420:57-61.
Law, M. et al. (2005) "Nanowire Dye-Sensitized Solar Cells," Nat. Mater. 4:455-459.
Leger, C. et al. (2008) "Direct Electrochemistry of Redox Enzymes as a Tool for Mechanistic Studies," Chem. Rev. 108:2379-2438.
Li et al. (2000) "A High-Rate, High-Capacity, Nanostructured Tin Oxide Electrode," Electrochem. Solid-StateLett. 3:316-318.
Li et al. (2000) "Rate Capabilities of Nanostructured $LiMn_2O_4$ Electrodes in Aqueous Electrolyte," J. Electrochem. Soc. 147:2044-2049.
Li et al. (2001) "Nanomaterial-Based Li-Ion Battery Electrodes," J. Power Sources 97/98:240-243.
Li et al. (2005) "Application of Ultrasonic Irradiation in Preparing Conducting Polymer As Active Materials for Supercapacitor," Mater. Lett.59:800-803.
Li, C. et al. (2004) "Electrochemical and Optical Properties of the Poly(3,4-ethylenedioxythiophene) Film Electropolymerized in an Aqueous Sodium Dodecyl Sulfate and Lithium Tetrafluoroborate Medium," Macromolecules 37:2411-2416.
Li, Q.G. et al. (2004) "Nanocrystalline α-$MnO_2$Nanowires by Electrochemical Step-Edge Decoration," Chem. Mater. 16:3402-3405.
Liu, R. (2008) "Poly(3,4-ethylenedioxythiophene) Nanotubes As Electrode Materials for a High-Powered Supercapacitor," Nanotechnol. 19:215710 (8 pages).
Liu, R. et al. (2003) "Shape Control in Epitaxial Electrodeposition: $Cu_2O$ Nanocubes on InP(001)," Chem. Mater. 15:4882-4885.
Liu, R. et al. (2008) "$MnO_2$/Poly(3,4-ethylenedioxythiophene) Coaxial Nanowires by One-Step Coelectrodeposition for Electrochemical Energy Storage," J. Amer. Chem. Soc. 130(10):2942-2943.
Liu,Z.Q. et al. (2005) "Single Crystalline Magnetite Nanotubes," J. Am. Chem. Soc. 127:6-7.
Lota et al. (2004) "Capacitance Properties of Poly(3,4-ethylenedioxythiophene)/Carbon Nanotubes Composites," J. Phys. Chem.Solids 65:295-301.
Malinauskas et al. (2005) "Conducting Polymer-Based Nanostructurized Materials: Electrochemical Aspects," Nanotechnology 16:R51-R62.
Martin C. R. (1995) "Template Synthesis of Electronically Conductive Polymer Nanostructures," Acc. Chem. Res. 28:61-68.
Martin, C. R. (1994) "Nanomaterials: A Membrane-Based Synthetic Approach," Science 266:1961-1966.
Mastragostino et al. (2000) "Polymer Selection and Cell Design for Electric-Vehicle Supercapacitors," J. Electrochem. Soc. 147:407-412.
Mieszawska, A.J. et al. (2007) "The Synthesis and Fabrication of One-Dimensional Nanoscale Heterojunctions," Small 3:722-756.

Nishizawa, M. et al. (1997) "*Template Synthesis of Polypyrrole-Coated Spinel LiMn$_2$O$_4$ Nanotubules and Their Properties as Cathode Active Materials for Lithium Batteries*," J. Electrochem. Soc. 144:1923-1927.

Niu et al. (1997) "*High Power Electrochemical Capacitors Based on Carbon Nanotube Electrodes*," Appl. Phys. Lett. 70:1480-1482.

Niu et al. (2001) ( "*Electrochemically Controlled Surface Morphology and Crystallinity in Poly(3,4-Ethylenedioxythiophene) Films*," Synth. Met. 122:425-429.

Nöel et al. (2003) "*Electrochemical Impedance Spectroscopy of an Oxidized Poly(3,4-Ethylenedioxythiophene) In Propylene Carbonate Solutions*," J. Electroanal. Chem. 558:4148.

Novak, P. et al. (1997) "*Electrochemically Active Polymers for Rechargeable Batteries*," Chem. Rev. 97:207-281.

Pandolfo et al. (2006) "*Carbon Properties and Their Role in Supercapacitors*," J. Power Sources 157:11-27.

Patrissi, C.J. et al. (1999) "*Sol-Gel-Based Template Synthesis and Li-Insertion Rate Performance of Nanostructured Vanadium Pentoxide*," J. Electrochem. Soc. 146:3176-3180.

Peng, X.S. et al. (2007) "*Mesoporous Separation Membranes of Polymer-Coated Copper Hydroxide Nanostrands*," Adv. Funct. Mater. 17:1849-1855.

Perepichka, I.F. et al. (2002) "*Hydrophilic Oligo(oxyethylene)-Derivatized Poly(3,4-ethylenedioxythiophenes): Cation-Responsive Optoelectroelectrochem-ical Properties and Solid-State Chromism*," Chem. Mater. 14:449-457.

Prasad et al. (2002) "*Electrochemical Studies of Polyaniline in a Gel Polymer Electrolyte*," Electrochem.Solid-State Lett. 5:A271-A274.

Prasad et al. (2002) "*Potentiodynamically Deposited Polyaniline on Stainless Steel*," J. Electrochem. Soc.149:A1393-A1399.

Randriamahazaka et al. (1999) "*Nucleation and Growth of Poly(3,4-Ethylenedioxythiophene) in Acetonitrile on Platinum Under Potentiostatic Conditions*," J. Electroanal. Chem. 472:103-111.

Rudge et al. (1994) "*Conducting Polymers As Active Materials in Electrochemical Capacitors*," J. Power Sources 47:89-107.

Ryu et al. (2004) "*Poly(ethylenedioxythiophene) (Pedot) as Polymer Electrode in Redox Supercapacitor*," Electrochim.Acta 50:843-847.

Sides et al. (2005) "*A High-Rate, Nanocomposite LiFePO$_4$/Carbon Cathode*," Electrochem. Solid-State Lett. 8:A484-A487.

Sides et al. (2005) "*Nanostructured Electrodes and the Low-Temperature Performance of Li-Ion Batteries*," Adv. Mater. 17:125-128.

Siegfried, M.J. et al. (2006) "*Elucidating the Effect of Additives on the Growth and Stability of Cu2O Surfaces via Shape Transformation of Pre-Grown Crystals*," J. Am. Chem. Soc. 128:10356-10357.

Song et al. (2006) "*Redox-Active Polypyrrole: Toward Polymer-Based Batteries*," Adv. Mater. 18:1764-1768.

Soudan et al. (2001) "*Chemical Synthesis and Electrochemical Properties of Poly(cyanosubstituted-diheteroareneethylene) as Conducting Polymers for Electrochemical Supercapacitors*," J. Electrochem. Soc. 148:A775-A782.

Therese,G.H.A. et al. (2000) "*Electrochemical Synthesis of Metal Oxides and Hydroxides*," Chem. Mater. 2000, 12:1195-1204.

Tian, B.Z. et al. (2007) "*Coaxial Silicon Nanowires As Solar Cells and Nanoelectronic Power Sources*," Nature 449:885-890.

Van Dyke et al. (1990) "*Electrochemical Investigations of Electronically Conductive Polymers. 4. Controlling the Supermolecular Structure Allows Charge Transport Rates to Be Enhanced*," Langmuir 6:1118-1123.

Villers et al. (2003) "*The Influence of the Range of Electroactivity and Capacitance of Conducting Polymers on the Performance of Carbon Conducting Polymer Hybrid Supercapacitor*," J. Electrochem. Soc. 150:A747-A752.

Wang, Y. et al. (2006) "*Nanostructured Vanadium Oxide Electrodes for Enhanced Lithium-Ion Intercalation*," Adv. Funct. Mater. 16:1133-1144.

Wang, Y. et al. (2006) "*Synthesis and Enhanced Intercalation Properties of Nanostructured Vanadium Oxides*," Chem. Mater. 18(12):2787-2804.

Winter, M. et al. (1999) "*Electrochemical Lithiation of Tin and Tin-Based Intermetallics and Composites*," Electrochim. Acta 45:31-50.

Winter, M. et al. (2004) "*What Are Batteries, Fuel Cells, and Supercapacitors?*" Chem. Rev. 104:4245-4269.

Wirtz et al. (2002) "*Template-Synthesized Nanotubes for Chemical Separations and Analysis*," Chem. Eur. J. 8:3572-3578.

Wu, M.S. et al. (2004) "*Fabrication of Nanostructured Manganese Oxide Electrodes for Electrochemical Capacitors*," Electrochem. Solid-State Lett. 7:A123-A126.

Xiao, R. et al. (2007) "*Controlled Electrochemical Synthesis of Conductive Polymer Nanotube Structures*," J. Am. Chem. Soc. 129:4483-4489.

Zhang, X. et al. (2005) "*Chemical Synthesis of PEDOT Nanofibers*," Chem. Commun. 5328-5330 (2005).

Zheng et al. (1995) "*Hydrous Ruthenium Oxide as an Electrode Material for Electrochemical Capacitors*," J. Electrochem. Soc. 142:2699-2703.

Zhu, C.L. et al. (2007) "*Synthesis of Core/Shell Metal Oxide/Polyaniline Nanocomposites and Hollow Polyaniline Capsules*," Nanotechnology 18:275604 (6 pages).

\* cited by examiner

HIGH-POWERED ELECTROCHEMICAL ENERGY STORAGE DEVICES AND METHODS FOR THEIR FABRICATION

CROSS-REFERENCE TO RELATED APPLICATIONS

This application claims priority to U.S. Patent Application Ser. No. 61/014,952 (filed on Dec. 19, 2007; pending), which application is herein incorporated by reference in its entirety.

STATEMENT REGARDING FEDERALLY SPONSORED RESEARCH OR DEVELOPMENT

This invention was made with government support under NSF DMR0520471 awarded by the National Science Foundation. The government has certain rights in the invention.

BACKGROUND OF THE INVENTION

1. Field of the Invention

The present invention relates to electrochemical storage devices, such as supercapacitors, batteries, etc., and more particularly to such devices that comprise an electrochemically active coaxial nanowire. The invention particularly concerns such devices in which the coaxial nanowire comprises an inner core of a transition metal oxide and an outer shell composed of an electroconductive organic polymer, such as poly(3,4-ethylenedioxythiophene) (PEDOT). The invention particularly relates to a facile method for achieving the self-assembly of such coaxial nanowires.

2. Description of Related Art

A. Electrochemical Supercapacitors

An electrochemical supercapacitor is an electrochemical energy storage device that provides high power while maintaining its energy density (or specific capacitance) at a high charge/discharge rate. To determine whether the above-described coaxial nanowires could be used to produce an electrochemical supercapacitor, the electrochemical properties of the coaxial nanowires were investigated.

Supercapacitors have received growing interest, with the increasing need for high-powered energy storage devices for electrical vehicles and mobile electronic devices (Winter et al. (2004) "*What Are Batteries, Fuel Cells, and Supercapacitors?*" Chem. Rev. 104:4245-4270; Burke, A. (2000) "*Ultracapacitors: Why, How, And Where Is The Technology,*" J. Power Sources 91:37-50; Vol'fkovich et al. (2002) "*Electrochemical Capacitors,*" Russ. J. Electrochem. 38:935-959). The supercapacitors work in conjunction with batteries to provide necessarily high peak power and enhance the life expectancy of the batteries. Based on their charge storage mechanism, supercapacitors are classified into two types: (i) an electrochemical double-layer capacitor ("EDLC") (Pandolfo et al. (2006) "*Carbon Properties And Their Role In Supercapacitors,*" J. Power Sources 157:11-27) that stores the energy non-faradaically by charging an electrochemical double layer at the interface between the porous electrode and the electrolyte, and (ii) a redox supercapacitor (Conway et al. (1997) "*The Role And Utilization Of Pseudocapacitance For Energy Storage By Supercapacitors,*" J. Power Sources 66:1-14) that stores energy faradaically using the pseudocapacitance behaviour of a redox-active material. Studies have been focused on investigating the redox supercapacitors because they feature high energy densities (or specific capacitances). Conductive polymers (Rudge et al. (1994) "*Conducting Polymers As Active Materials In Electrochemical Capacitors,*" J. Power Sources 47:89-107; Conway, B. E. (1999) In: ELECTROCHEMICAL SUPERCAPACITORS: SCIENTIFIC FUNDAMENTALS AND TECHNOLOGICAL APPLICATIONS (New York: Plenum) p. 299; Song et al. (2006) "*Redox-Active Polypyrrole Toward Polymer-Based Batteries,*" Adv. Mater. 18:1764-1768) and transition metal oxides (Zheng et al. (1995) "*Hydrous Ruthenium Oxide as an Electrode Material for Electrochemical Capacitors,*" J. Electrochem. Soc. 142:2699-2703; Hu et al. (2003) "*Nanostructures and Capacitive Characteristics of Hydrous Manganese Oxide Prepared by Electrochemical Deposition,*" J. Electrochem. Soc. 150:A1079-A1082) are promising materials for a redox supercapacitor because they can be readily converted between oxidized (doped) and reduced (dedoped) states by switching the applied potentials. This conversion process involves the diffusion of counter-ions into/out of conductive polymer or metal oxide films to keep their electroneutrality, which is a fundamental characteristic of a redox capacitor. Conductive polymers have been intensively investigated as electrode materials for supercapacitors because of their excellent electrochemical reversibilities, fast switching between redox states, high conductivity in a doped state, mechanical flexibility, low toxicity, and low cost (Malinauskas et al. (2005) "*Conducting Polymer-Based Nanostructurized Materials Electrochemical Aspects,*" Nanotechnology 16:R51-R62; Arbizzani et al. (2001) "*New Trends In Electrochemical Supercapacitors,*" J. Power Sources 100:164-170). In particular, poly(3,4-ethylenedioxythiophene) (PEDOT) is perceived as a good candidate for a supercapacitor (Carlberg et al. (1997) "*Poly(3,4-ethylenedioxythiophene) as Electrode Material in Electrochemical Capacitors,*" J. Electrochem. Soc. 144 L61-L64; Ryu et al. (2004) "*Poly(ethylenedioxythiophene) (PEDOT) As Polymer Electrode In Redox Supercapacitor,*" Electrochim. Acta 50:843-847; Lota et al. (2004) "*Capacitance Properties Of Poly(3,4-ethylenedioxythiophene)/Carbon Nanotubes Composites,*" J. Phys. Chem. Solids 65:295-301; Li et al. (2005) "*Application Of Ultrasonic Irradiation In Preparing Conducting Polymer As Active Materials For Supercapacitor,*" Mater. Lett. 59:800-803) because of its high stability among other conductive polymers (Heywang et al. (1992) "*Poly (alkylenedioxythiophene)s-New, Very Stable Conducting Polymers,*" Adv. Mater. 4:116-118). To date, most of the studies on PEDOT-based supercapacitors have been focused on enhancing their specific capacitances. For example, Lota et al. achieved a high specific capacitance of about 150 F $g^{-1}$ by using PEDOT/carbon nanotube composites (Lota et al. (2004) "*Capacitance Properties Of Poly(3,4-ethylenedioxythiophene)/Carbon Nanotubes Composites,*" J. Phys. Chem. Solids 65:295-301). Li et al. enhanced the specific capacitance of PEDOT from 72 to 100 F $g^{-1}$ using sponge-like PEDOT structures synthesized under ultrasonic irradiation (Li et al. (2005) "*Application Of Ultrasonic Irradiation In Preparing Conducting Polymer As Active Materials For Supercapacitor,*" Mater. Lett. 59:800-803). Jang et al reported that a high specific capacitance (155-170 F $g^{-1}$) of PEDOT was achieved by selective fabrication of PEDOT nanocapsules and mesocellular foams (Jang et al. (2006) "*Selective Fabrication of Poly(3,4-ethylenedioxythiophene) Nanocapsules and Mesocellular Foams Using Surfactant-Mediated Interfacial Polymerization,*" Adv. Mater. 18:354-358). Besides achieving high specific capacitance (high energy density), the issue of how to obtain high power from PEDOT as an electrode material for a supercapacitor also needs immediate attention because more and more modern electronic devices require not only high energy but also high power.

In a redox supercapacitor, the high power can be achieved by enhancing the charge/discharge rate for the redox reaction.

However, the conversion between redox states is governed by the mass transfer of counter-ions (Ingram et al. (2004) *"Ladder-Doped' Polypyrrole: A Possible Electrode Material For Inclusion In Electrochemical Supercapacitors?"* J. Power Sources 129:107-112). The difficulty in keeping pace with a fast charging/discharge process at high power demand will lead to inefficient utilization of the electrode material, i.e. a loss of usable energy. A similar problem exists in lithium ion batteries: the slow diffusion of the lithium ion in the solid phase of the electrode materials limits its rate capability (Aricò et al. (2005) *"Nanostructured Materials For Advanced Energy Conversion And Storage Devices,"* Nat. Mater. 4:366-377; Cho et al. (2005) *"Nanotube-Based Ultrafast Electrochromic Display,"* Adv. Mater. 17:171-175; Cho et al. (2005) *"Electrochemical Synthesis and Fast Electrochromics of Poly (3,4-ethylenedioxythiophene) Nanotubes in Flexible Substrate,"* Chem. Mater. 17:4564-4566; Xiao et al. (2007) *"Controlled Electrochemical Synthesis of Conductive Polymer Nanotube Structures,"* J. Am. Chem. Soc. 129:4483-4489; Hu et al. (2006) *"Design and Tailoring of the Nanotubular Arrayed Architecture of Hydrous $RuO_2$ for Next Generation Supercapacitors,"* Nano Lett. 6:2690-2695). Because of the intrinsic structural characteristics of arrays of one-dimensional hollow nanotubular structures (Aricò et al. (2005) *"Nanostructured Materials For Advanced Energy Conversion And Storage Devices,"* Nat. Mater. 4:366-377; Cho et al. (2005) *"Nanotube-Based Ultrafast Electrochromic Display,"* Adv. Mater. 17:171-175; Cho et al. (2005) *"Electrochemical Synthesis and Fast Electrochromics of Poly(3,4-ethylenedioxythiophene) Nanotubes in Flexible Substrate,"* Chem. Mater. 17:4564-4566; Xiao et al. (2007) *"Controlled Electrochemical Synthesis of Conductive Polymer Nanotube Structures,"* J. Am. Chem. Soc. 129:4483-4489; Hu et al. (2006) *"Design and Tailoring of the Nanotubular Arrayed Architecture of Hydrous $RuO_2$ for Next Generation Supercapacitors,"* Nano Lett. 6:2690-2695), the use of such arrays has emerged as a possible solution for achieving a fast charge/discharge rate. The thin nature of the nanotube wall enables the rapid redox processes of electroactive materials such as conductive polymers and metal oxides by providing a short diffusion distance to the counter-ions. Furthermore, long nanotubes can provide high surface area and enough mass loading for electrode materials to store sufficient energy. Enhanced charge transport rates in template-synthesized one-dimensional nanomaterials have been reported (Van Dyke et al. (1990) *"Electrochemical Investigations Of Electronically Conductive Polymers. 4. Controlling The Supermolecular Structure Allows Charge Transport Rates To Be Enhanced,"* Langmuir 6:1118-1123; Cai et al. (1992) *"Electrochemical Investigations Of Electronically Conductive Polymers VII. Charge Transport In Lightly Doped Polypyrrole,"* Synth. Met. 46:165-179; Martin C. R. (1995) *"Template Synthesis of Electronically Conductive Polymer Nanostructures,"* Acc. Chem. Res. 28:61-68). For example, research has shown that higher lithium ion insertion rates could be achieved using nanofibres of vanadium pentoxide (Patrissi et al. (1999) *"Sol-Gel-Based Template Synthesis and Li-Insertion Rate Performance of Nanostructured Vanadium Pentoxide,"* J. Electrochem. Soc. 146:3176-3180; Sides et al. (2005) *"Nanostructured Electrodes and the Low-Temperature Performance of Li-Ion Batteries,"* Adv. Mater. 17:125-128), tin oxide (Li et al. (2000) *"A High-Rate, High-Capacity, Nanostructured Tin Oxide Electrode,"* Electrochem. Solid-StateLett. 3:316-318; Li et al. (2001) *"Nanomaterial-Based Li-Ion Battery Electrodes,"* J. Power Sources 97/98:240-243), and $LiFePO_4$/carbon composite (Sides et al. (2005) *"A High-Rate, Nanocomposite $LiFePO_4$/Carbon Cathode,"* Electrochem. Solid-State Lett. 8:A484-A487) and nanotubes of $LiMn_2O_4$ (Li et al. (2000) *"Rate Capabilities of Nanostructured $LiMn_2O_4$ Electrodes in Aqueous Electrolyte,"* J. Electrochem. Soc. 147:2044-2049) and $TiS_2$ (Che et al. (1997) *"Chemical-Vapor Deposition-Based Template Synthesis of Microtubular $TiS_2$ Battery Electrodes,"* J. Electrochem. Soc. 144:4296-4302). Fast switching between coloured and decoloured states of PEDOT can be found in our recent development of a nanotubebased devices (Cho et al. (2005) *"Nanotube-Based Ultrafast Electrochromic Display,"* Adv. Mater. 17:171-175; Cho et al. (2005) *"Electrochemical Synthesis and Fast Electrochromics of Poly (3,4-ethylenedioxythiophene) Nanotubes in Flexible Substrate,"* Chem. Mater. 17:4564-4566), that are also related to the fast charge/discharge rate. However, the application of coaxial PEDOT nanowires as supercapacitor electrode materials has not been studied before.

B. Nanowire Materials

A major challenge of the 21$^{st}$ century lies in the development of low-cost and environmentally friendly rechargeable energy storage systems (Arico, A. S. et al. (2005) *"Nanostructured Materials For Advanced Energy Conversion And Storage Devices,"* Nat. Mater. 4:366-377). Lithium ion batteries currently comprise preferred energy storage systems. In a typical lithium ion battery, the negative electrode (anode) comprises a lithium-storing metal (e.g., alloys of lithium and aluminum, silicon or tin). The anode is separated from the positive electrode (typically a lithium metal oxide) by a lithium ion-conducting electrolyte. When a lithium ion battery is discharging, lithium is extracted from the anode and inserted into the cathode. When the battery is charging, the reverse process occurs: lithium is extracted from the cathode and inserted into the anode. Unfortunately, the process of lithium insertion into the anode is associated with significant volume changes which strain and thus limit the useful life of the battery.

One proposed solution to this dilemma involves the use of nano-sized metallic clusters as the anode material (Huggins, R. A. (1999) *"Lithium Alloy Anodes,"* In: HANDBOOK OF BATTERY MATERIALS (Bernhard, J. O., Ed.), Part III, pp. 359-382; Wiley-VDCH, Weinheim); Winter, M. et al. (1999) *"Electrochemical Lithiation Of Tin And Tin-Based Intermetallics And Composites,"* Electrochim. Acta 45:31-50; Nazar, L. F. et al. (2004) "Anodes and Composite Anodes: An Overview," In: LITHIUM BATTERIES SCIENCE AND TECHNOLOGY, (Nazri, G.-A. et al., Eds.), pp. 112-143; Kluwer Academic/Plenum, Boston). Unfortunately, such materials exhibit potentially significant side reactions, and are difficuly to produce with uniformity. Accordingly, they have not been fully satisfactory (Arico, A. S. et al. (2005) *"Nanostructured Materials For Advanced Energy Conversion And Storage Devices,"* Nat. Mater. 4:366-377).

Kim et al. (U.S. Pat. No. 7,084,002) describes a nanostructured electrode that comprises a metal oxide ($MnO_2$) electrode that is substantially or completely free of an electroconductive organic polymer.

One-dimensional (1D) nanostructured materials have been intensively investigated as building components in electrochemical energy storage devices (Arico, A. S. et al. (2005) *"Nanostructured Materials For Advanced Energy Conversion And Storage Devices,"* Nat. Mater. 4:366-377; Patrissi, C. J. et al. (1999) *"Sol-Gel-Based Template Synthesis and Li-Insertion Rate Performance of Nanostructured Vanadium Pentoxide,"* J. Electrochem. Soc. 146:3176-3180; Hu, C. C. et al. (2006) *"Design and Tailoring of the Nanotubular Arrayed Architecture of Hydrous RuO2 for Next Generation Supercapacitors,"* Nano Lett. 6:2690-2695; Li, Q. G. et al. (2004) *"Nanocrystalline α-$MnO_2$ Nanowires by Electrochemical*

Step-Edge Decoration," Chem. Mater. 16:3402-3405) and in solar energy conversion devices (Law, M. et al. (2005) "Nanowire Dye-Sensitized Solar Cells," Nat. Mater. 4:455-459; Goodey, A. P. et al. (2007) "Silicon Nanowire Array Photelectrochemical Cells," J. Am. Chem. Soc. 129:12344-12345) because they provide short diffusion path lengths to ions and excitons, leading to high charge/discharge rates.

More recently, coaxial nanowires have attracted greater attention in this field due to their added synergic properties (e.g., high conductivity) (Kim, D. W. et al. (2007) "Highly Conductive Coaxial $SnO_2$—$In_2O_3$ Heterostructured Nanowires for Li Ion Battery Electrodes," Nano Lett. 7:3041-3045) or functionalities (e.g., core/shell p-n junction) (Kovtyukhova, N. L. et al. (2005) "Nanowire p-n Heterojunction Diodes Made by Templated Assembly of Multilayer Carbon-Nanotube/Polymer/Semiconductor-Particle Shells around Metal Nanowires," Adv. Mater. 17:187-192; Tian, B. Z. et al. (2007) "Coaxial Silicon Nanowires As Solar Cells And Nanoelectronic Power Sources," Nature 449:885-890) arising from the combination of different materials (Kim, D. W. et al. (2007) "Highly Conductive Coaxial $SnO_2$—$In_2O_3$ Heterostructured Nanowires for Li Ion Battery Electrodes," Nano Lett. 7:3041-3045; Kovtyukhova, N. L. et al. (2005) "Nanowire p-n Heterojunction Diodes Made by Templated Assembly of Multilayer Carbon-Nanotube/Polymer/Semiconductor-Particle Shells around Metal Nanowires," Adv. Mater. 17:187-192; Tian, B. Z. et al. (2007) "Coaxial Silicon Nanowires As Solar Cells And Nanoelectronic Power Sources," Nature 449:885-890; Mieszawska, A. J. et al. (2007) "The Synthesis and Fabrication of One-Dimensional Nanoscale Heterojunctions," Small 3:722-756; Wang, Y. et al. (2006) "Nanostructured Vanadium Oxide Electrodes for Enhanced Lithium-Ion Intercalation," Adv. Funct. Mater. 16:1133-1144; Fan, H. J. et al. (2006) "Monocrystalline Spinel Nanotube Fabrication Based On The Kirkendall Effect," Nat. Mater. 5:627-631; Liu, Z. Q. et al. (2005) "Single Crystalline Magnetite Nanotubes," J. Am. Chem. Soc. 127:6-7).

Various materials such as semiconductor/semiconductor, metal/metal oxide, and metal oxide/metal oxide, have been employed as core/shell in coaxial nanowires (Kim, D. W. et al. (2007) "Highly Conductive Coaxial $SnO_2$—$In_2O_3$ Heterostructured Nanowires for Li Ion Battery Electrodes," Nano Lett. 7:3041-3045; Kovtyukhova, N. L. et al. (2005) "Nanowire p-n Heterojunction Diodes Made by Templated Assembly of Multilayer Carbon-Nanotube/Polymer/Semiconductor-Particle Shells around Metal Nanowires," Adv. Mater. 17:187-192; Tian, B. Z. et al. (2007) "Coaxial Silicon Nanowires As Solar Cells And Nanoelectronic Power Sources," Nature 449:885-890; Mieszawska, A. J. et al. (2007) "The Synthesis and Fabrication of One-Dimensional Nanoscale Heterojunctions," Small 3:722-756; Wang, Y. et al. (2006) "Nanostructured Vanadium Oxide Electrodes for Enhanced Lithium-Ion Intercalation," Adv. Funct. Mater. 16:1133-1144; Fan, H. J. et al. (2006) "Monocrystalline Spinel Nanotube Fabrication Based On The Kirkendall Effect," Nat. Mater. 5:627-631; Liu, Z. Q. et al. (2005) "Single Crystalline Magnetite Nanotubes," J. Am. Chem. Soc. 127:6-7).

Despite all such prior advances, a need remains for energy storages systems capable of use in modern electronic devices and particularly for such devices that can be readily formed and which do not require complex and/or multi-step synthesis. The present invention is directed to this and other needs.

SUMMARY OF THE INVENTION

The present invention relates to electrochemical storage devices, such as supercapacitors, batteries, etc., and more particularly to such devices that comprise an electrochemically active coaxial nanowire. The invention particularly concerns such devices in which the coaxial nanowire comprises an inner core of a transition metal oxide axially surrounded by an outer shell composed of an electroconductive organic polymer, such as poly(3,4-ethylenedioxythiophene) (PEDOT). The invention particularly relates to a facile method for achieving the self-assembly of such coaxial nanowires.

In detail, the invention concerns a method for producing an electrochemically active coaxial nanowire, which method comprises contacting a substrate with a composition comprising:

(A) ions of a transition metal; and
(B) an electropolymerizable organic compound; under conditions sufficient to cause:
(i) the ions of the transition metal to oxidize to a metal oxide forming a core of the coaxial nanowire; and
(ii) the electropolymerizable organic compound to polymerize into an elctropolymerized organic compound forming a shell axially surrounding the core.

The invention further concerns the embodiment of the above-described method wherein the transition metal is selected from the group consisting of Ac, Ag, Au, Cd, Ce, Co, Cr, Cu, Dy, Er, Eu, Fe, Gd, Hf, Hg, Ho, Ir, La, Lu, Mn, Mo, Nb, Nd, Ni, Os, Pd, Pr, Pt, Re, Rh, Ru, Sc, Sm, Ta, Tb, Tc, Th, Ti, Tm, U, V, W, Y, Yb, Zn and Zr, and more particularly, the embodiment of the above-described method wherein the transition metal is selected from the group consisting of Ag, Ce, Co, Cr, Cu, Fe, La, Mn, Mo, Nb, Nd, Ni, Ru, Ta, Ti, V, W, Zn and Zr, and most particularly, the embodiment of the above-described method wherein the transition metal is Mn.

The invention further concerns the embodiments of the above-described methods wherein the electropolymerized organic compound is PEDOT or a derivative or position isomer thereof, and more particularly, wherein the electropolymerized organic compound is PEDOT.

The invention further concerns the embodiments of the above-described methods wherein the substrate comprises an electrode and a porous film or membrane, and the metal oxide is in electrical contact with the electrode.

The invention further concerns the embodiments of the above-described methods wherein the substrate comprises an alumina or polymer template that guides the forming a core of the coaxial nanowire or the forming a shell axially surrounding the core.

The invention further concerns the embodiments of the above-described methods wherein the conditions comprise application of a voltage potential to the substrate, the voltage potential being from about 0.6 V to about 0.85 V, as determined using an Ag/AgCl electrode.

The invention further concerns the embodiments of the above-described methods wherein the transition metal is Mn, the electropolymerized organic compound is PEDOT or a derivative or position isomer thereof, and the conditions comprise application of a voltage potential to the substrate, the voltage potential being from about 0.6 V to about 0.85 V, as determined using an Ag/AgCl electrode.

The invention further concerns the embodiments of the above-described methods wherein the metal oxide and the electropolymerized organic compound are coelectrodeposited on the substrate.

The invention further concerns the embodiments of the above-described methods wherein the voltage potential is about 0.75 V.

The invention also provides an electrochemical energy storage device, wherein the device comprises a coaxial nanowire having a transition metal oxide core located within an axially surrounding shell of an electroconductive organic polymer, wherein the nanowire preserves at least 85% of its specific capacitance as current density increases from 5 to 25 mA/cm².

The invention further concerns the embodiment of the above-described electrochemical energy storage device wherein the transition metal is selected from the group consisting of Ac, Ag, Au, Cd, Ce, Co, Cr, Cu, Dy, Er, Eu, Fe, Gd, Hf, Hg, Ho, Ir, La, Lu, Mn, Mo, Nb, Nd, Ni, Os, Pd, Pr, Pt, Re, Rh, Ru, Sc, Sm, Ta, Tb, Tc, Th, Ti, Tm, U, V, W, Y, Yb, Zn and Zr, and the electroconductive organic polymer is PEDOT or a derivative or position isomer thereof, and more preferably, wherein the transition metal is selected from the group consisting of Ag, Ce, Co, Cr, Cu, Fe, La, Mn, Mo, Nb, Nd, Ni, Ru, Ta, Ti, V, W, Zn and Zr and the electroconductive organic polymer is PEDOT or a derivative or position isomer thereof. The invention particularly concerns the embodiment of the above-described electrochemical energy storage device wherein the transition metal is Mn and the electroconductive organic polymer is PEDOT or a derivative or position isomer thereof.

The invention further concerns the embodiments of the above-described electrochemical energy storage device wherein the device is a battery or a supercapacitor.

BRIEF DESCRIPTION OF THE DRAWINGS

FIG. 2, Panel a shows a scanning electron microscope (SEM) image of free-standing coaxial nanowires of the present invention grown at 0.75 V after removal of template. FIG. 2, Panel b shows a transmission electron microscope (TEM) image of a single coaxial nanowire of the present invention grown at 0.75 V after removal of template. FIG. 2, Panel c shows maps of sulfur atom presence from the boxed area of FIG. 2, Panel b. FIG. 2, Panel d shows maps of manganese atom presence from the boxed area of FIG. 2, Panel b and illustrates that the $MnO_2$ of the nanowire resides in the nanowire's central core. FIG. 2, Panel e shows PEDOT shell thickness variation with applied potential. The scale bars shown in the lower right of each image of Panel e is 50 nm.

FIG. 4 (Panel A) shows PEDOT nanotubes obtained from $MnO_2$/PEDOT coaxial nanowire synthesized at 0.75 V. FIG. 4 (Panel B) shows thin PEDOT nanotubes (collapsed and twisted) obtained from $MnO_2$/PEDOT coaxial nanowire synthesized at 0.7 V.

DETAILED DESCRIPTION OF THE INVENTION

Figure 1:
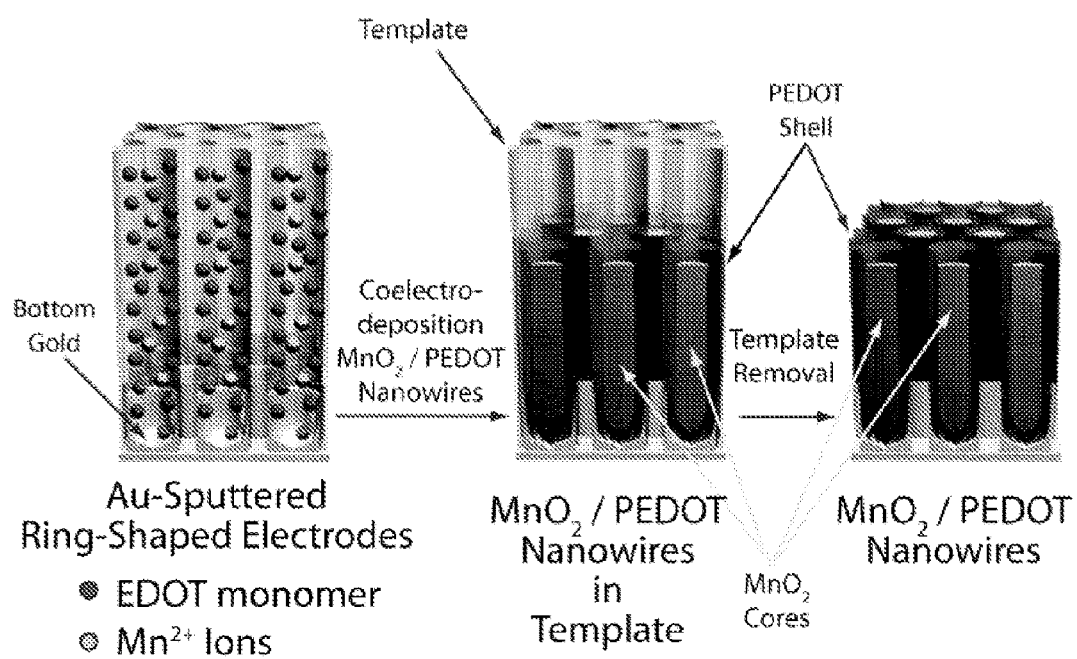
FIG. 1 illustrates the growth of $MnO_2$/PEDOT coaxial nanowires of the present invention.

As used herein, the term "electrochemical energy storage device" is intended to refer to any device capable of converting a chemical redox reaction into an electrical energy or potential (voltage). Such devices include batteries, capacitors, supercapacitors, etc. The preferred electrochemical energy storage devices of the present invention comprise electrochemically active coaxial nanowires. As used herein, the term "coaxial nanowire" is intended to refer to a preferably pipe-like structure having an inner core that is located within an axially surrounding shell (or sheath). The term "nanotube" is intended to refer to a preferably pipe-like structure composed on a shell or sheath, but lacking an inner core. Thus, for example, a nanotube is created by removing the inner core from the coaxial nanowires of the invention. As used herein, a shell of a coaxial nanowire is said to "axially" surround the nanowire's core if, along the coaxial axis of the nanowire, it substantially or completely surrounds the core. The axially surrounding shell of a coaxial nanowire of the present invention may, but need not, additionally encase one or both ends of the nanowire's core. In preferred embodiments, the inner core of such coaxial nanowires will comprise a transition metal and/or an oxide thereof. The term "electrochemically active" is intended to denote that both the core and the shell materials participate in electrochemical reactions to store and discharge electrical energy, and that the organic polymer shell is electroconductive, such that ions and/or electrons are capable of transiting the shell to interact with the atoms of the transition metal oxide core of the coaxial nanowire.

As discussed above, various materials such as semiconductor/semiconductor, metal/metal oxide, and metal oxide/metal oxide, have been employed as core/shell in coaxial nanowires. However, there have been few studies on the coaxial nanowires with transition metal oxide and conductive polymer, although both materials of them are important electroactive materials used in electrochemical energy storage (Winter, M. et al. (2004) "*What Are Batteries, Fuel Cells, and Supercapacitors?*" Chem. Rev. 104:4245-4269; Novak, P. et al. (1997) "*Electrochemically Active Polymers for Rechargeable Batteries*," Chem. Rev. 97:207-281; Desilvestro, J. et al. (1990) "*Metal Oxide Cathode Materials for Electrochemical Energy Storage: A Review*," J. Electrochem. Soc. 137:C5-C22).

One aspect of the present invention relates to the finding that the combination of one or more transition metal oxide and a conductive polymer in a coaxial nanowire structure exhibits excellent electrical, electrochemical, and mechanical properties for electrochemical energy storage. As used herein, the term "transition metal oxide" denotes oxides of the metals whose atoms have an incomplete d sub-shell, or which can give rise to cations with an incomplete d sub-shell. Such metals include: Ac, Ag, Au, Cd, Ce, Co, Cr, Cu, Dy, Er, Eu, Fe, Gd, Hf, Hg, Ho, Ir, La, Lu, Mn, Mo, Nb, Nd, Ni, Os, Pd, Pr, Pt, Re, Rh, Ru, Sc, Sm, Ta, Tb, Tc, Th, Ti, Tm, U, V, W, Y, Yb, Zn and Zr. Mn (manganese) is a particularly preferred transitional metal for the purposes of the present invention.

Oxides of such metals (e.g., AgO, $Al_2O_3$, $Al_2O_3$-M oxides, $BaTiO_3$, $CeO_2$, $CO_2O_3$, $CoO_2$, $Cr_2O_3$, $Fe_{3-x}Li_xO_4$, FeO, $La_{1-x}M_xCrO_3$ (M=Ca, Sr, or Ba), $LaCoO_3$, $LaFeO_3$, $LaMnO_3$, $Ln_2Cr_3O_{12}\cdot 7H_2O$, $MnO_2$, $Mo_{1-x}M_xO_3$ (M=Co, Cr, Ni, W or Zn), $Nb_2O_5$, $Nd_2CuO_4$, $Ni(OH)_2$, $Ni(OH)_2/NiOOH$, NiO(OH), $Pb_8Tl_5O_{24}$, $PbO_2$, thallic oxides, $TiO_2$, $TiO_2$, $V_2O_5$ (preferably hydrated), $WO_3$ (preferably with Co, Cr, Fe, Mo, Ni, Ru, and/or Zn), $WO_3$, $ZrO_2$, $ZrTiO_4$, etc.) and methods for their synthesis are disclosed by Therese, G. H. A. et al. (2000) "*Electrochemical Synthesis of Metal Oxides and Hydroxides*," Chem. Mater. 2000, 12:1195-1204.

In particular, $MnO_2$ a preferred metal oxide of the present invention. $MnO_2$ is one of the most popular electrochemical energy storage materials because of its high energy density, low cost, environmental friendliness, and natural abundance (Chang, J. K. et al. (2003) "*Material Characterization and Electrochemical Performance of Hydrous Manganese Oxide Electrodes for Use in Electrochemical Pseudocapacitors*," J. Electrochem. Soc. 150:A1333-A1338; Wu, M. S. et al. (2004) "*Fabrication of Nanostructured Manganese Oxide Electrodes for Electrochemical Capacitors*," J. Electrochem. Solid-State Lett. 7:A123-A126). However, it has poor conductivity (Desilvestro, J. et al. (1990) "*Metal Oxide Cathode Materials for Electrochemical Energy Storage: A Review*," J. Electrochem. Soc. 137:C5-C22).

As indicated above, the cores of the coaxial nanowires of the present invention are located within an axially surrounding "shell". Most preferably, the shell is composed of an electroconductive organic polymer.

To date, only a few reports have been published on the synthesis of metal oxide/conductive polymer with core/shell structures (Zhu, C. L. et al. (2007) "*Synthesis Of Core/Shell Metal Oxide/Polyaniline Nanocomposites And Hollow Polyaniline Capsules*," Nanotechnology 18:275604; Peng, X. S. et al. (2007) "*Mesoporous Separation Membranes of Polymer-Coated Copper Hydroxide Nanostrands*," Adv. Funct. Mater. 17:1849-1855; Nishizawa, M. et al. (1997) "*Template Synthesis of Polypyrrole-Coated Spinel $LiMn_2O_4$ Nanotubules and Their Properties as Cathode Active Materials for Lithium Batteries*," J. Electrochem. Soc. 144:1923-1927). In all of these reports, a stepwise synthetic approach was adopted: metal oxide nanoparticles (Zhu, C. L. et al. (2007) "*Synthesis Of Core/Shell Metal Oxide/Polyaniline Nanocomposites And Hollow Polyaniline Capsules*," Nanotechnology 18:275604), nanostrands (Peng, X. S. et al. (2007) "*Mesoporous Separation Membranes of Polymer-Coated Copper Hydroxide Nanostrands*," Adv. Funct. Mater. 17:1849-1855) or nanotubes (Nishizawa, M. et al. (1997) "*Template Synthesis of Polypyrrole-Coated Spinel $LiMn_2O_4$ Nanotubules and Their Properties as Cathode Active Materials for Lithium Batteries*," J. Electrochem. Soc. 144:1923-1927) were first synthesized and subsequently coated chemically by conductive polymers as shells. An exemplary implementation of the present invention overcomes the need for the above multi-step synthetic approach for fabricating coaxial nanowires.

Exemplary implementations of the present invention use poly(3,4-ethylenedioxythiophene) ("PEDOT") as the electroconductive polymer of such structures. The structure of PEDOT is shown below:

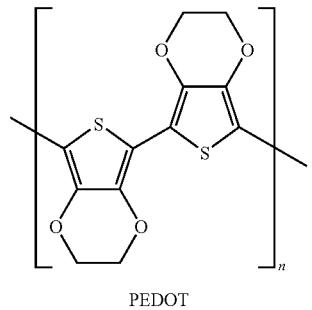

PEDOT

In further exemplary implementations of the invention, PEDOT can be mixed with additional conductive or non-conductive polymers (e.g., poly(styrenesulfonate)). Alternatively, derivatives of PEDOT may be used as conductive polymers in the devices of the present invention. Examples of such derivatives include poly 2,3-dihydrothieno[3,4][1,4]dioxin-2-yl methanol ("PEDOT-CH$_2$OH") and poly 3,4-dihydro-2H-thieno[3,4-b][1,4]dioxepin-3-01 ("PropOT") (see, Ha, Y.-H. et al. (2004) "*Towards a Transparent, Highly Conductive Poly(3,4-ethylenedioxythiophene*," Adv. Funct. Mater. 14(6):615-622), and their position isomers.

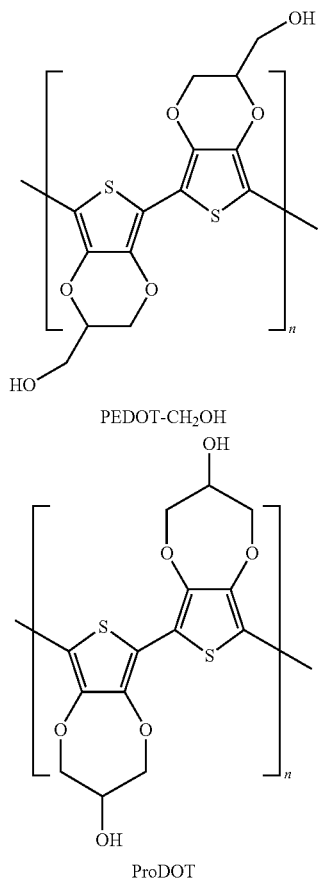

PEDOT-CH$_2$OH

ProDOT

PEDOT and its derivatives have merits of excellent conductivity, high stability and mechanical flexibility, moderate band gap, and high optical transparency in its electrically conductive state but it provides low electrochemical energy density (see, U.S. Pat. No. 7,342,708; Groenendaal, L. B. et al. (2000) "*Poly(3,4-ethylenedioxythiophene) and Its Derivatives: Past, Present, and Future*," Adv. Mater. 12:481; Groenendaal, L. B. et al. (2003) "*Electrochemistry of Poly(3, 4-alkylenedioxythiophene) Derivatives*," Adv. Mater. 15:855-879; Heywang, G. (1992) "*Poly(alkylenedioxythiophene)s— New, Very Stable Conducting Polymers*," Adv. Mater. 4:116-118; F. Perepichka, I. F. et al. (2002) "*Hydrophilic Oligo (oxyethylene)-Derivatized Poly(3,4-ethylenedioxythiophenes): Cation-Responsive Optoelectroelectrochem-ical Properties and Solid-State Chromism*," Chem. Mater. 14:449-457; Zhang, X. et al. (2005) "*Chemical Synthesis of PEDOT Nanofibers*," Chem. Commun. 5328-5330; Ha, Y.-H. et al. (2004) "*Towards a Transparent, Highly Conductive Poly(3,4-ethylenedioxythiophene*," Adv. Funct. Mater. 14(6):615-622).

Powders and films of PEDOT obtained so far have granular or particulate morphology which has seriously limited studies on 1D transport (Zhang, X. et al. (2005) "*Chemical Synthesis of PEDOT Nanofibers*," Chem. Commun. 5328-5330). Thus the art has attempted to identify methods suitable for forming PEDOT nanofibers. Zhang, X. et al. (2005) report a single-step method of such synthesis in which the PEDOT monomer ("EDOT") is dissolved in aqueous organic acid (i.e., 1.0 M DL-camphorsulfonic acid ("CSA") using (NH$_4$)$_2$S$_2$O$_8$ as oxidant in the presence of V$_2$O$_5$ nanofiber seeds (15-20 nm diameter). The synthesis was taught to be carried out in air at room temperature, and the product isolated by filtering the reaction mixture and washing the precipitate with aqueous HCl. Zhang, X. et al. (2005) report that the produced PEDOT nanofibers adhered to contacting surfaces to form a film that under scanning electron microscopy had the form of a non-woven mesh, whose fibers were 3-10 microns long and 100-180 nm in diameter, and which exhibited a pressed pellet conductivity $\sigma_{RT}$=16 S cm$^{-1}$. Significantly, the produced mesh exhibited substantially reduced conducting ability relative to commercially available PEDOT films on PET (ORGA-CON EL 1500™; Agfa-Gevaert Group). Thus, although the method of Zhang, X. et al. (2005) is stated to yield PEDOT nanofibers, such nanofibers arrange themselves into a 2 dimensional film (Zhang, X. et al. (2005) "*Chemical Synthesis of PEDOT Nanofibers*," Chem. Commun. 5328-5330).

In contrast, an exemplary implementation of the present invention provides a process for producing PEDOT nanofibers that form as coaxial nanowires having transition metal oxide cores. Preferably, such transition metal oxide/PEDOT coaxial nanowires are produced by coelectrodeposition using a porous alumina template (see, Martin, C. R. (1994) "*Nanomaterials: A Membrane-Based Synthetic Approach*," Science 266:1961-1966). Although other methods of templating may be employed, electrodeposition is preferred because it is a simple yet versatile method in controlling structures and their composition by tuning applied potentials and electrolyte ingredients (Liu, R. et al. (2003) "*Shape Control in Epitaxial Electrodeposition Cu$_2$O Nanocubes on InP(001)*," J. Chem. Mater. 15:4882-4885; Siegfried, M. J. et al. (2006) "*Elucidating the Effect of Additives on the Growth and Stability of Cu$_2$O Surfaces via Shape Transformation of Pre-Grown Crystals*," J. Am. Chem. Soc. 128:10356-10357; Ji, C. X. et al. (2002) "*Fabrication Of Nanoporous Gold Nanowires*," Appl. Phys. Lett. 81:4437-4439).

Such coaxial nanowires may be advantageously used to produce high-powered electrochemical energy storage devices. The transition metal oxide cores provide high energy storage capacity, while the highly conductive, porous, and flexible PEDOT shell facilitates the electron transport and ion diffusion into the core and protects it from structurally significant collapsing and breaking. These combined properties enable the coaxial nanowires to have very high specific capacitances at high current densities.

In the description that follows, the invention is described with respect to an exemplary implementation of an MnO$_2$/PEDOT coaxial nanowire. It will, however, be recognized that such description is solely for purposes of illustration, and that the present invention relates to coaxial nanowires composed of MnO$_2$ and PEDOT derivatives as well as other transitional metal oxides in concert with PEDOT and/or its derivatives. Although monomers of EDOT are used as the precursors of the PEDOT polymer, it will be appreciated that higher level condensates (e.g., EDOT dimmers, trimers, etc.) may alternatively or additionally be employed. Similarly, although the invention is described with respect to the use of a single organic polymer, it will be appreciated that mixtures of electroconductive polymers may be employed. Similarly, mixtures of electroconductive and non-elecconductive polymers may be employed.

Although preferred alumina and polymer templates are recited herein, other nanoporous templates are also contemplated for use in the methods of the invention. Thus, other preferred nano-porous templates include metals, ceramics, clays, zeolites, and the like, which can be capable of forming an ordered or random nano-porous structure, which can be stable to deposition of a conductive metal by sputtering and metal oxide precipitation, and which can be removed by sodium hydroxide or other suitable base.

FIG. 1 illustrates the growth of $MnO_2$/PEDOT coaxial nanowires. Under a constant potential (for example, 0.75 V vs Ag/AgCl), $Mn^{2+}$ (10 mM manganese acetate) is converted to its higher oxidization state, which can readily undergo hydrolysis to yield MnO, (Chang, J. K. et al. (2003) "*Material Characterization and Electrochemical Performance of Hydrous Manganese Oxide Electrodes for Use in Electrochemical Pseudocapacitors,*" J. Electrochem. Soc. 150: A1333-A1338; Wu, M. S. et al. (2004) "*Fabrication of Nanostructured Manganese Oxide Electrodes for Electrochemical Capacitors,*" J. Electrochem. Solid-State Lett. 7:A123-A126). Simultaneously, EDOT monomer (80 mM) is electropolymerized into PEDOT in the pores of the template (Li, C. et al. (2004) "*Electrochemical and Optical Properties of the Poly(3,4-ethylenedioxythiophene) Film Electropolymerized in an Aqueous Sodium Dodecyl Sulfate and Lithium Tetrafluoroborate Medium,*" Macromolecules 37:2411-2416). Unexpectedly, such coelectrodepositions gives rise to formation of coaxial nanowires.

Figure 2:
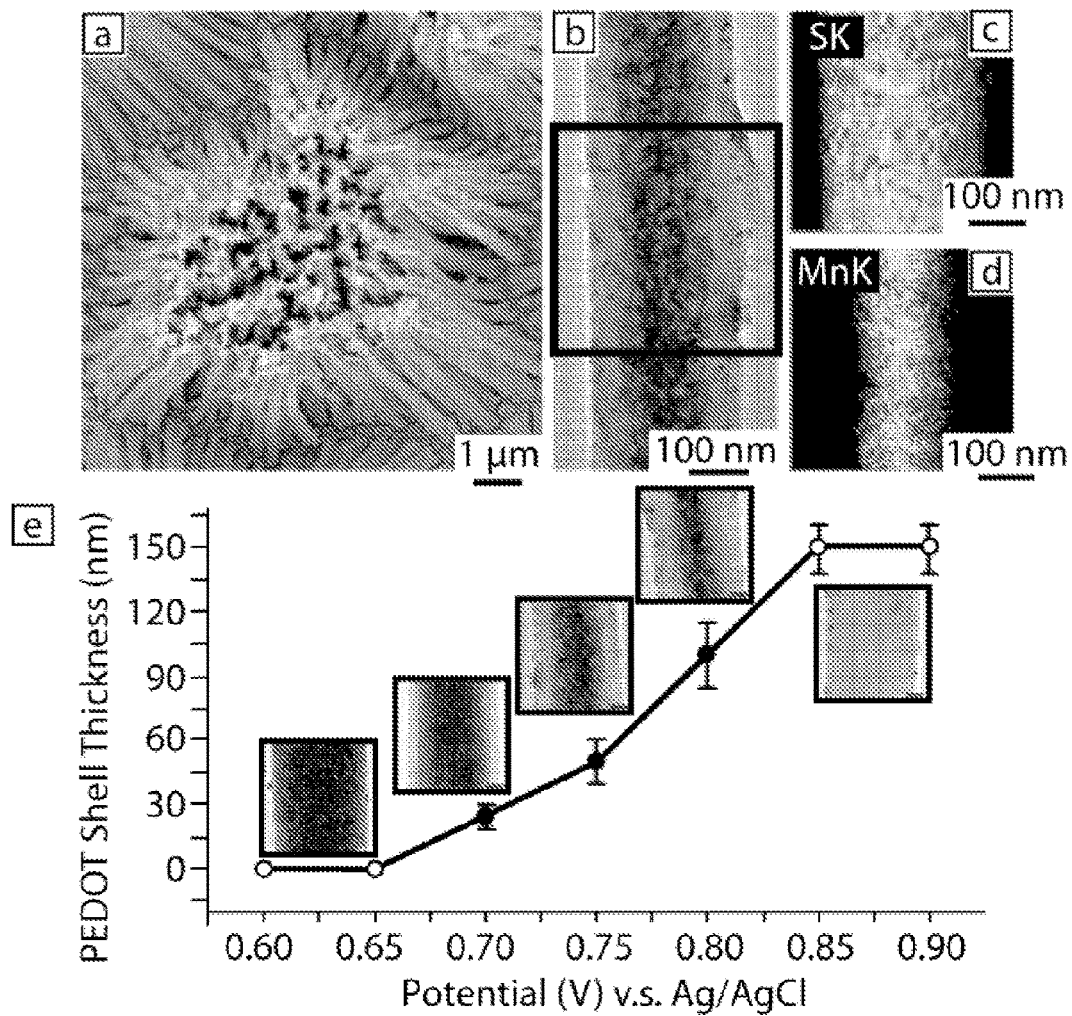
FIG. 2 (Panels a-e) shows the $MnO_2$/PEDOT coaxial nanowires of the energy storage devices of the present invention.

FIG. 2 (Panels a-e) shows the $MnO_2$/PEDOT coaxial nanowires of the energy storage devices of the present invention. FIG. 2, Panel a shows a scanning electron microscope (SEM) image of free-standing coaxial nanowires of the present invention grown at 0.75 V after removal of template. FIG. 2, Panel b shows a transmission electron microscope (TEM) image of a single coaxial nanowire of the present invention grown at 0.75 V after removal of template.

Although the core $MnO_2$ and shell PEDOT can be easily distinguished by their morphologies in TEM images, energy dispersive X-ray spectroscopic (EDS) elemental maps of S and Mn (FIG. 2, Panel c and Panel d, respectively) from the designated area in FIG. 2, Panel b clearly confirms the coaxial nanostructure. The electron diffraction pattern reveals that the core MnO2 is amorphous (see Example 1).

The structures of the produced coaxial nanowires (such as the thickness of the PEDOT shell or the length of the nanowire) can be easily controlled and varied. This aspect of the invention provides an ability to tune and select the electrochemical properties of the coaxial nanowires. Since the onset growth potential of $MnO_2$ (0.5 V) is lower than that of PEDOT (0.75 V), $MnO_2$ nanowires can be selectively and preferably grown below 0.6 V. PEDOT nanowires are preferably grown at potentials above 0.85 V due to the higher growth rate of PEDOT given that the concentration of EDOT monomer is 8 times that of $Mn^{2+}$. Between these two extreme potentials, coaxial nanowires with various PEDOT shell thicknesses (25-100 nm) can be obtained, as shown in FIG. 2, Panel e. By selectively removing the $MnO_2$ cores in these coaxial nanowires (as by, for example, wet etching), PEDOT nanotubes with different wall thicknesses can be obtained and observed using TEM (see Example 1).

Significantly, the inner surface morphology of the PEDOT nanotubes appears somewhat rough and spiky. This finding suggests that the PEDOT may have grown into the MnO2 core layer. This can be further determined through an EDS line-scan profile on a single coaxial nanowire (see Example 1).

Without intending to be bound thereby, it is believed that such PEDOT penetrations may play a role in further improving the conductivity of the core. The sputtered ring-shape Au electrodes at the bottom of the pores have been shown to be capable of directing the growth of PEDOT nanotubes at low overpotential (Xiao, R. et al. (2007) "*Controlled Electrochemical Synthesis of Conductive Polymer Nanotube Structures,*" J. Am. Chem. Soc. 129:4483-4489; Cho, S. I. et al. (2005) "*Electrochemical Synthesis and Fast Electrochromics of Poly*(3,4-*ethylenedioxythiophene*) *Nanotubes in Flexible Substrate,*" Chem. Mater. 17:4564-4566). This observation appears to explain the preferential formation of the PEDOT shell. In addition, $MnO_2$ and PEDOT tend to have phase segregation when coelectrodeposited at bulk electrode surface (see Example 1). Additionally, without intending to be bound to any particular mechanism, the phase segregation of these two materials may force the MnO2 to grow in the spaces left by the PEDOT shells to thereby form the nanowire cores.

In the coaxial nanowires of an energy storage device described in an exemplary implementation of the present invention, the $MnO_2$ provides high energy storage capacity, while the highly conductive, porous, and flexible PEDOT shell facilitates the electron transport and ion diffusion into the core $MnO_2$ and protects it from structurally significant collapsing and breaking. These combined properties enable the coaxial nanowires to have very high specific capacitances at high current densities.

Having now generally described the invention, the same will be more readily understood through reference to the following examples, which are provided by way of illustration and are not intended to be limiting of the present invention unless specified.

EXAMPLE 1

Production of
$MnO_2$/Poly(3,4-ethylenedioxythiophene) Coaxial
Nanowires by One Step Coelectrodeposition Experimental Section Chemicals and Materials: 3,4-Ethylenedioxythipene (EDOT), manganese acetate and lithium perchlorate ($LiClO_4$) were purchased from Sigma Aldrich (Milwaukee, Wis.). Sodium dodecyl sulphate and sodium sulfate were obtained from Fisher Scientific (Fair Lawn, N.J.). De-ionized water (ca. 18 MΩ·$cm^{-1}$ in resistivity) was made by a Milli-Q water purification system (Millipore; Dubuque, Iowa). Alumina membranes of 200 nm in pore diameter and 60 μm in thickness are commercially available from Whatman (Clifton, N.J.). Indium tin oxide (ITO) glass ($R_s$=4-8 ohms, thickness 1.1 mm) was commercial available from Delta Technologies Limited.

Synthesis: Coaxial $MnO_2$/PEDOT nanowires were synthesized potentiostatically at 0.7-0.8 V an aqueous solution of 10 mM manganese acetate, 80 mM EDOT, 100 mM $LiClO_4$ and 140 mM SDS (pH=6.5). $MnO_2$ nanowires were synthesized at 0.75 V in an aqueous solution of 10 mM manganese acetate. PEDOT nanowires were synthesized at 1 V in 80 mM EDOT, 100 mM $LiClO_4$ and 140 mM SDS. Bulk $MnO_2$ film was synthesized at 0.5 V in aqueous solution of 100 mM manganese acetate on ITO glass. All electrode potentials were measured relative to an Ag/AgCl reference electrode using a Pt foil as a counter electrode, unless otherwise specified.

The preparation of a working electrode is as follows: first, a thin layer of gold (ca. 500 nm) was sputtered onto the branched side of an alumina membrane by using a sputtering system (Denton Vacuum Desktop III). The Au-coated membrane was connected to an electrical circuit using a copper tape (3M). Defining and sealing an electroactive window (0.32 cm$^2$ in nominal area) was performed using silicone rubber or parafilm. Considering the porosity of the membrane (60%), the corrected surface area of the electroactive window was 0.2 cm$^2$. The mass and the length (thickness in film) of the resulting MnO$_2$ nanowires, PEDOT nanowires, MnO$_2$/PEDOT coaxial nanowries, MnO$_2$ bulk film, was controlled by fixing the total charges passed during the electrodeposition. Typically coaxial nanowires with lengths of 10 μm can be obtained after the charge passed about 200 mC. Diameters of these nanowires are corresponded to the pore diameters of alumina template (ca. 300 nm).

Characterizations: The resulting nanowires were investigated using a field-emission scanning electron microscope (SEM; Hitachi S-4700, operated at an acceleration voltage of 5 keV) and a transmission electron microscope (Jeol 2100F Field Emission Transmission Electron Microscope (FE-TEM), 200 keV). In brief, for the sampling methods for SEM and TEM analysis, a gold-coated side of a small piece of an alumina template was tightly attached onto an SEM specimen holder by using a carbon tape. The template was dissolved to expose the nanowires by using 3 M NaOH. After rinsing it with de-ionized water repeatedly, the sample was dried in air before observation. For TEM sampling, 3M NaOH was used to remove the template and aqua regia was used to remove the gold layer and core MnO$_2$. The released nanowires were repeatedly rinsed with de-ionized water and ethanol. Then, 6 μL of the nanowire solution was dropped and dried on a TEM grid.

In order to calculate specific capacitance, galvanostatic charge/discharge test were performed by cycling potential from 0 to 1 V at different current densities. Cyclic voltammetry was performed in a potential range between 0 and 1 V at different scan rates of 250 mV/s in 1 M Na$_2$SO$_4$. All the above electrochemical experiments were performed using a bi-potentiostat (BI-STAT; Princeton Applied Research).

Figure 3:
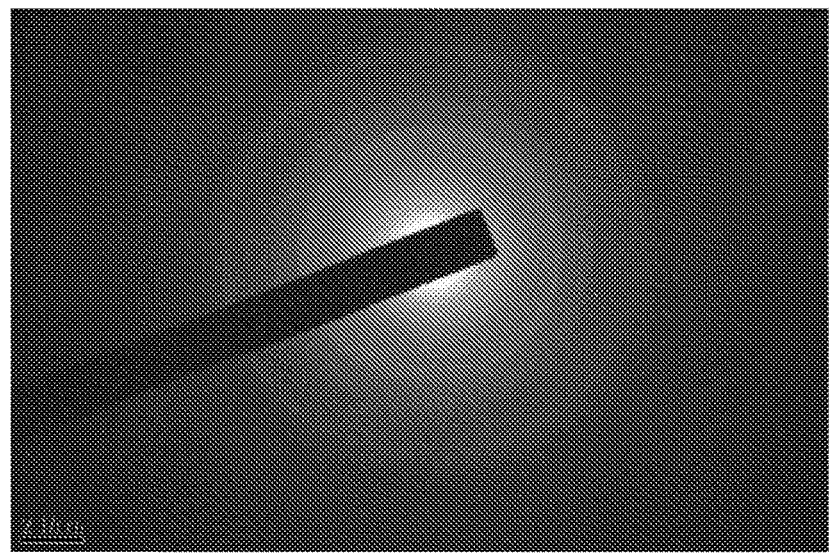
FIG. 3 shows the electron diffraction pattern on coaxial nanowires synthesized at 0.75 V.
Figure 4:
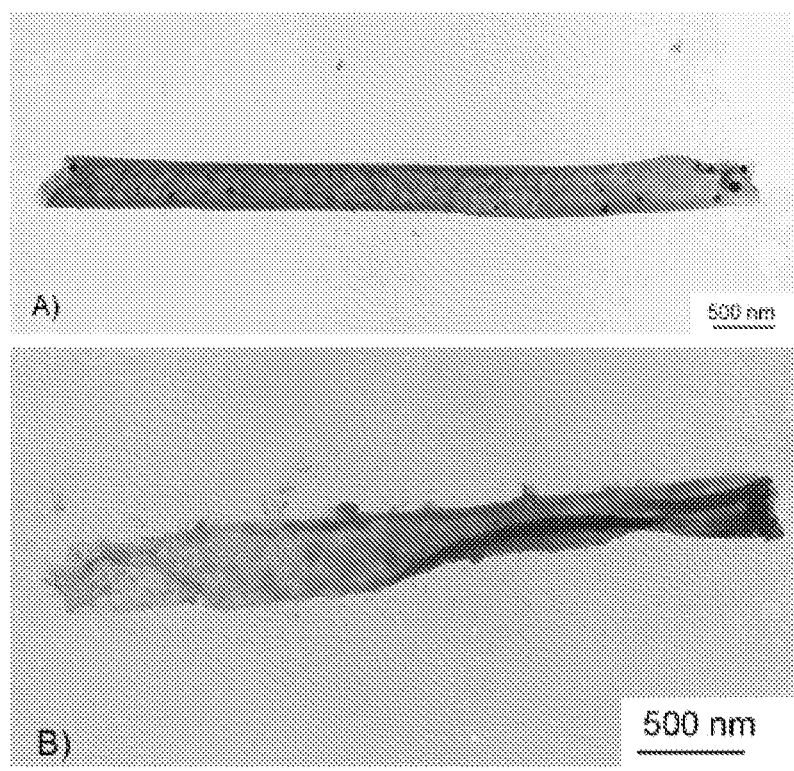
FIG. 4 (Panel A and Panel B) shows the images obtained from TEM of the corresponding PEDOT nanotubes after removal of the template and the core $MnO_2$.
Figure 5:
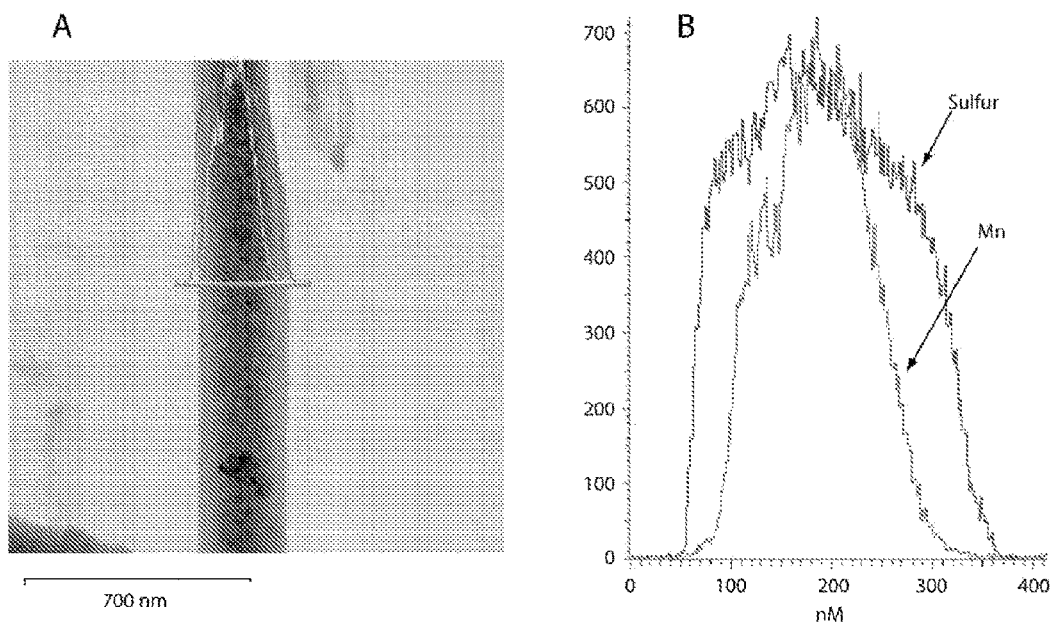
FIG. 5 (Panel A and Panel B) shows EDS line-scan elemental analysis of sulfur and manganese (Panel B) on a single coaxial nanowire (Panel A).

The electron diffraction pattern on coaxial nanowires synthesized at 0.75 V is shown in FIG. 3. FIG. 4 (Panel A and Panel B) shows the images obtained from TEM of the corresponding PEDOT nanotubes after removal of the template and the core MnO$_2$. FIG. 4 (Panel A) shows PEDOT nanotubes obtained from MnO$_2$/PEDOT coaxial nanowire synthesized at 0.75 V. FIG. 4 (Panel B) shows thin PEDOT nanotubes (collapsed and twisted) obtained from MnO$_2$/PEDOT coaxial nanowire synthesized at 0.7 V. FIG. 5 (Panel A and Panel B) shows EDS line-scan elemental analysis of sulfur and manganese (Panel B) on a single coaxial nanowire (Panel A). When compared to elemental mapping cross-section from coaxial nanowires that have pure phases in their cores and shells (Lauhon, L. J. et al. (2002) "*Epitaxial Core-Shell And Core-Multishell Nanowire Heterostructures,*" Nature 420:57-61), the elemental mapping profile of sulfur indicates that PEDOT may have grown into the MnO2 core. The coaxial nature of the nanowires was additionally confirmed by the observation that phase segregation occurred when PEDOT and MnO$_2$ are coelectrodeposited on the bulk ITO electrode at 0.75 V in the same aqueous solution used for the synthesis of coaxial nanowires.

Figure 6:
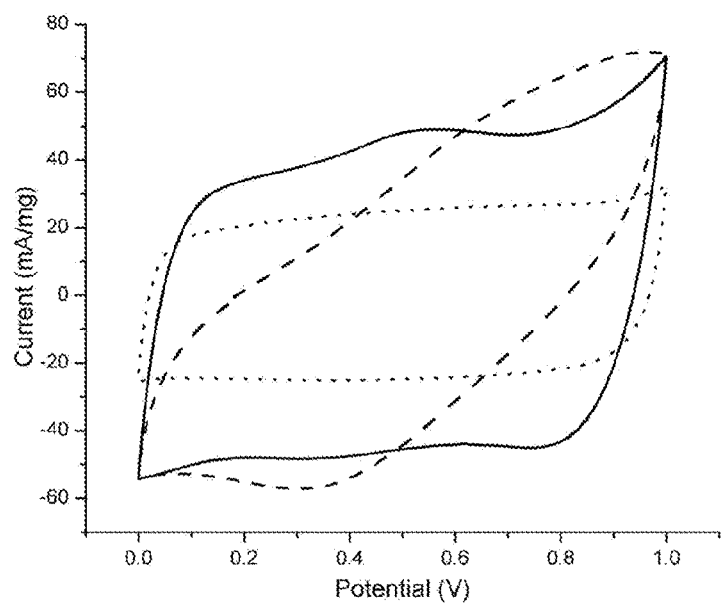
FIG. 6 shows data of a cyclic voltammogram (CV) of PEDOT nanowires (dotted line), $MnO_2$ nanowries (dashed line), and $MnO_2$/PEDOT coaxial nanowires (solid line) scanned from 0-1 V in 1 M $Na_2SO_4$. (aq) at the scan rate of 250 mV/s.

Cyclic voltammograms (CV) of PEDOT nanowires (dotted line), MnO$_2$ nanowires (dashed line), MnO$_2$/PEDOT coaxial nanowires (solid line) scanned from 0-1 V in 1 M Na2SO4 (aq) were conducted at the scan rate of 250 mV/s (FIG. 6). The CV shape of coaxial nanowires is more rectangular-like than that of MnO$_2$ nanowires, a finding which suggests that the coaxial nanowires exhibit the behaviors more like an ideal capacitor.

Figure 7:
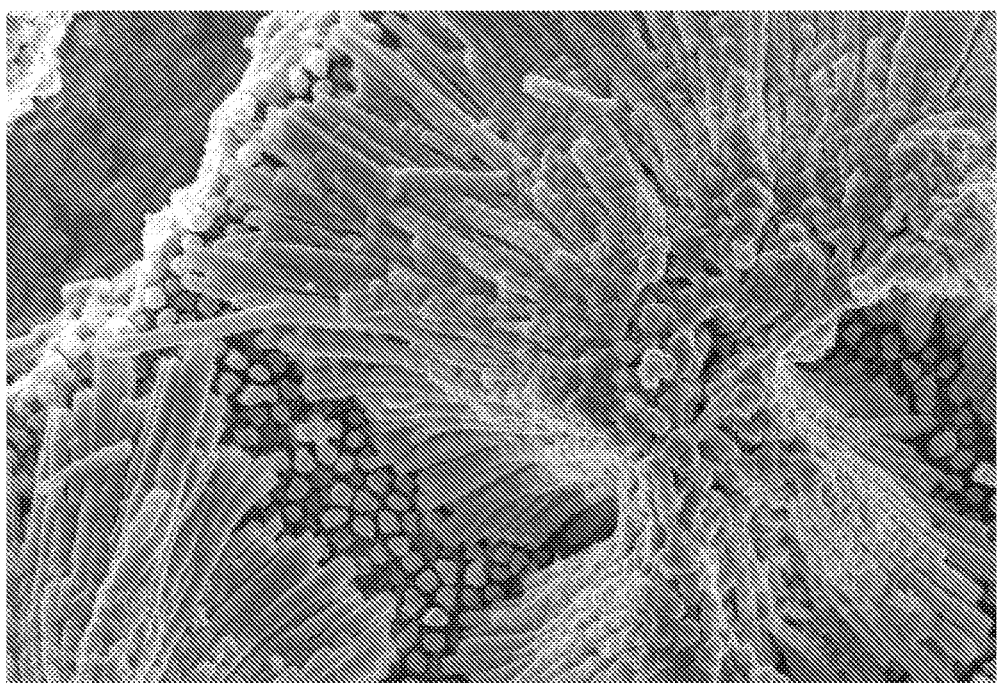
FIG. 7 shows an SEM image (5.0 kV 11.2 mm×8.00 k SE(U)) of the $MnO_2$ nanowires after removal of template and drying process (gradations are 5.00 µm).

FIG. 7 shows an SEM image (5.0 kV 11.2 mm×8.00 k SE(U)) of MnO$_2$ nanowires after removal of template and drying process (gradations are 5.00 μm). Significant breaking and collapsing can be clearly seen.

Figure 8:
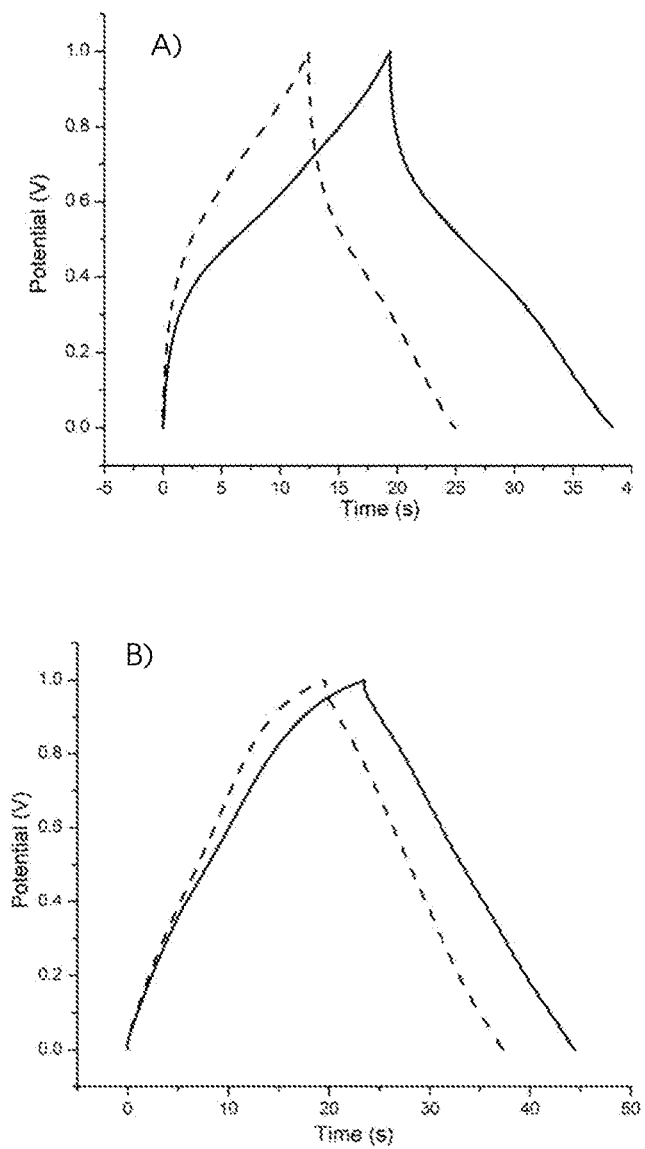
FIG. 8 (panels A and B) shows a galvanostatic charge/discharge curve before drying (solid lines) and after drying (dashed lines) for $MnO_2$ nanowires (Panel A), and for $MnO_2$/PEDOT coaxial nanowires (Panel B). The data shows that the $MnO_2$ nanowires lose the specific capacitance more significantly than MnO2/PEDOT nanowires.

FIG. 8 (panels A and B) shows a galvanostatic charge/discharge curve before drying (solid lines) and after drying (dashed lines) for MnO$_2$ nanowires (Panel A), and for MnO$_2$/PEDOT coaxial nanowires (Panel B). The data shows that the MnO$_2$ nanowires lose the specific capacitance more significantly than MnO2/PEDOT nanowires.

Figure 9:
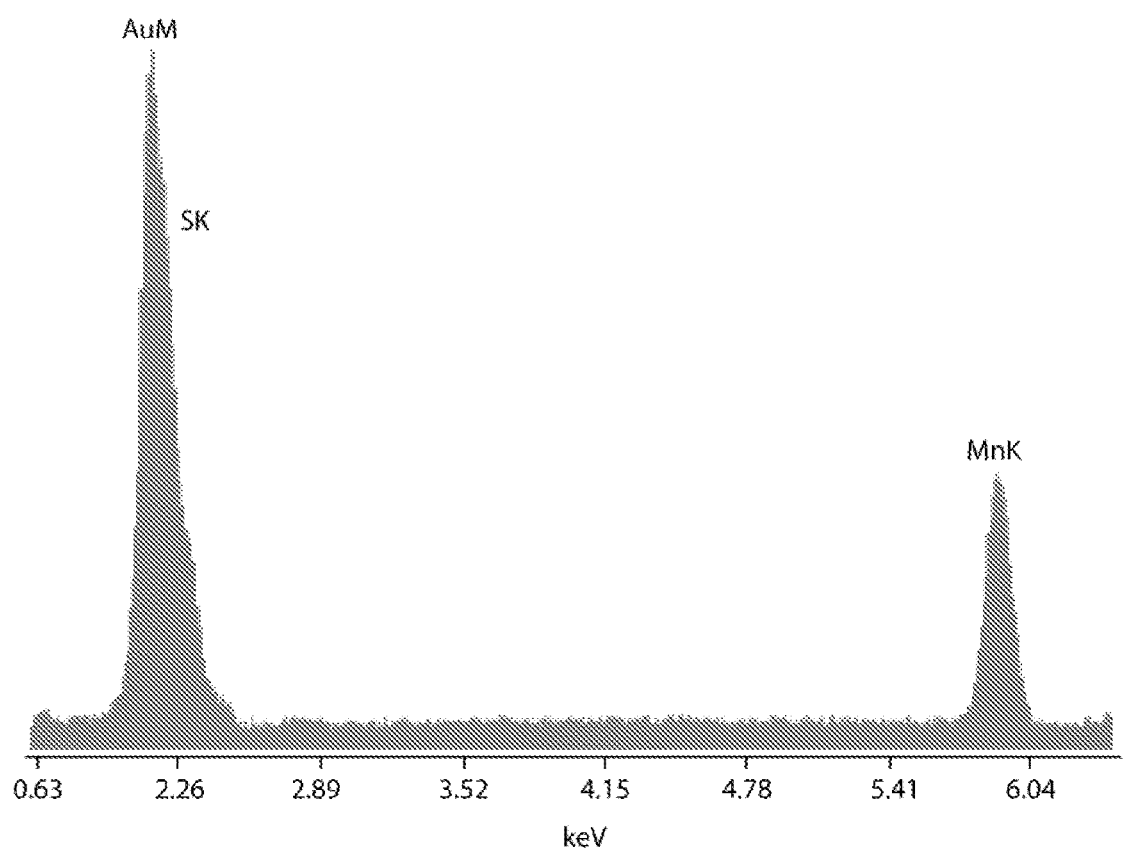
FIG. 9 shows EDS data for $MnO_2$/PEDOT coaxial nanowires synthesized at 0.75 V.

EDS data for MnO$_2$/PEDOT coaxial nanowires synthesized at 0.75 V is shown in FIG. 9 (Element SK: 8.47 Wt %; 24.05 At %; Element MnK: 16.41 Wt %; 27.2 At %).

Figure 10:
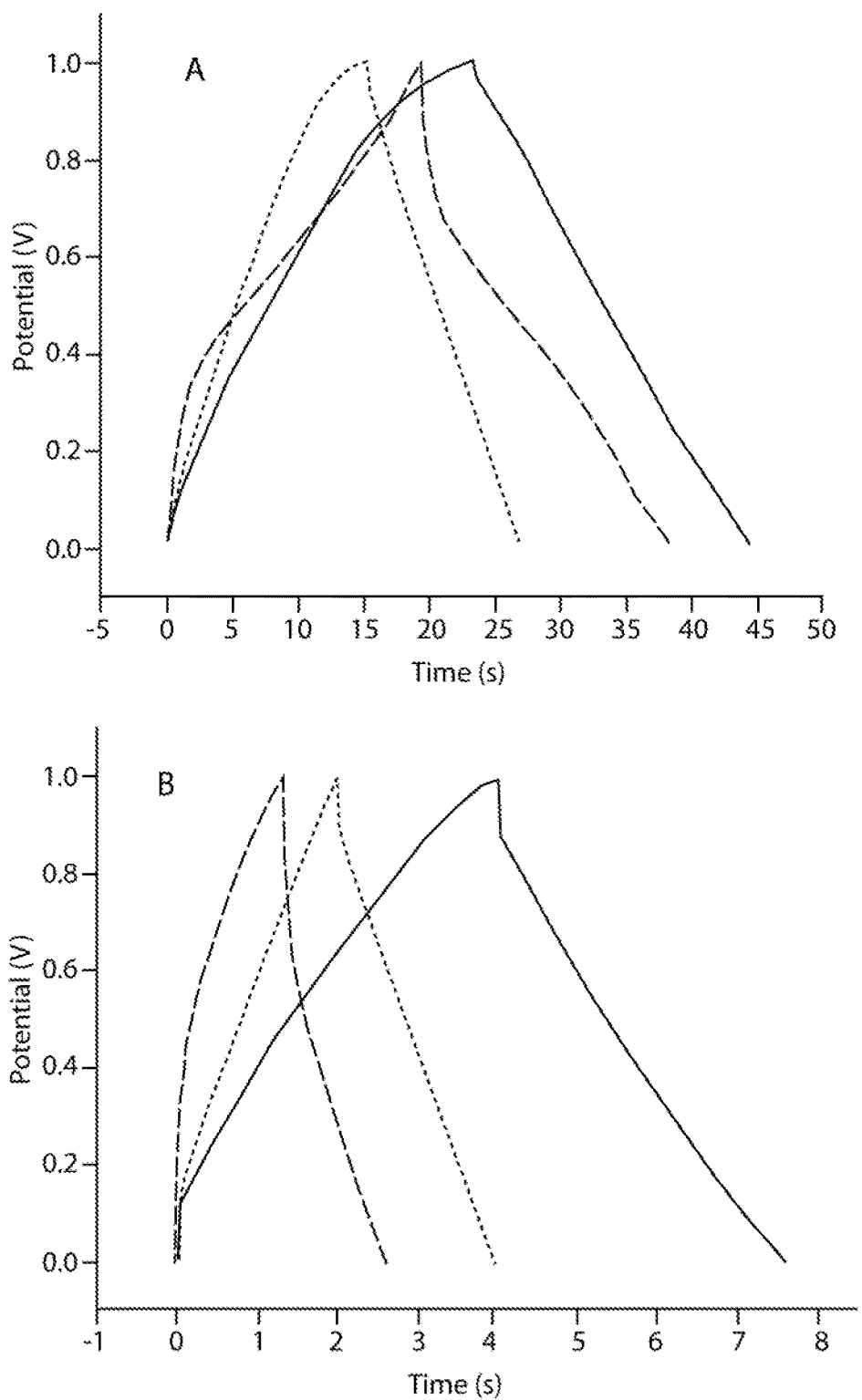
FIG. 10 shows galvanostatic charge/discharge curves of PEDOT nanowires (dotted lines), $MnO_2$ nanowires (dashed lines) and $MnO_2$/PEDOT coaxial nanowires (solid lines) at current density of (A) 5 mA/cm² and (B) 25 mA/cm². Calculations based on these curves indicated coaxial nanowires exhibit not only high specific capacitance values but also maintain them well at high current density. The coaxial nanowires preserved 85% of its specific capacitance (210 to 185 F/g) as the current density increases from 5 to 25 mA/cm².

FIG. 10 shows galvanostatic charge/discharge curves of PEDOT nanowires (dotted lines), MnO$_2$ nanowires (dashed lines) and MnO$_2$/PEDOT coaxial nanowires (solid lines) at current density of (A) 5 mA/cm$^2$ and (B) 25 mA/cm$^2$. Calculations based on these curves indicated coaxial nanowires exhibit not only high specific capacitance values but also maintain them well at high current density. The coaxial nanowires preserved 85% of its specific capacitance (210 to 185 F/g) as the current density increases from 5 to 25 mA/cm$^2$.

Calculations: Specific capacitance $C_{spec}=I/(dV/dt)m_e$, where dV/dt is the potential change rate determined from galvanostatic charge/discharge curve (See FIG. 10), $m_e$ is the mass of electrochemically active materials. For MnO$_2$ nanowires, MnO$_2$ bulk film and PEDOT nanowires, the mass of electrode is calculated from the charge passed for the electrochemical deposition. For MnO$_2$/PEDOT nanowires, their mass is obtained based on the total charge and the molar ratio of MnO$_2$ to PEDOT determined by the EDS (See FIG. 9).

EXAMPLE 2

Electrochemical Properties of Coaxial Nanowires

An electrochemical supercapacitor is an electrochemical energy storage device that provides high power while maintaining its energy density (or specific capacitance) at a high charge/discharge rate. To determine whether the above-described coaxial nanowires could be used to produce an electrochemical supercapacitor, the electrochemical properties of the coaxial nanowires were investigated.

Figure 11:
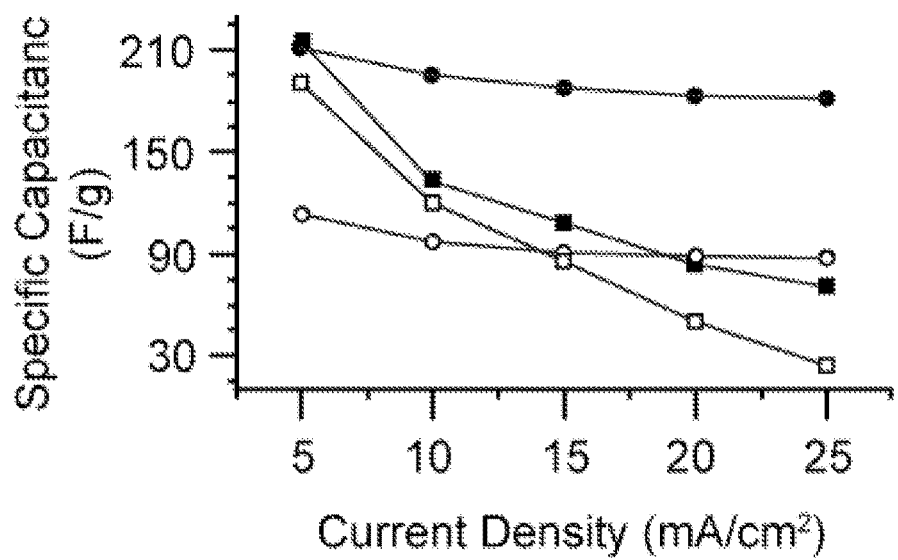
FIG. 11 shows the specific capacitance of $MnO_2$ nanowires (closed squares), PEDOT nanowires (open circles), $MnO_2$ thin film (open squares) and $MnO_2$/PEDOT coaxial nanowires (closed circles) at difference charge/discharge current densities.

Specific capacitance values of coaxial nanowires (grown at 0.75V), MnO$_2$ nanowires, PEDOT nanowires, and MnO$_2$ thin film at different current densities are shown in FIG. 11.

The coaxial nanowires not only exhibit high specific capacitance values but also maintain them well at high current density compared to the others. As shown in FIG. 11, the coaxial nanowires preserved 85% of its specific capacitance (from 210 to 185 F/g) as the current density increases from 5 to 25 mA/cm$^2$. These specific capacitance values are comparable to those of electrodeposited MnO$_2$ films (190-240 F/g), which however decreased significantly with increased current densities (e.g., from 210 to 40 F/g at current density of 1-10 mA/cm$^2$) (Chang, J. K. et al. (2003) "*Material Characterization and Electrochemical Performance of Hydrous Manganese Oxide Electrodes for Use in Electrochemical Pseudocapacitors,*" J. Electrochem. Soc. 150:A1333-A1338; Wu, M. S. et al. (2004) "*Fabrication of Nanostructured Manganese Oxide Electrodes for Electrochemical Capacitors,*" J. Electrochem. Solid-State Lett. 7:A123-A126). The specific capacitance of coaxial nanowires is higher than that of PEDOT nanowires as a result of the inclusion of MnO$_2$ as cores. The well-maintained specific capacitance is mainly due to short paths of ion diffusion in the nanowires. Therefore, even at high current density (high power demand), the nanowire materials of the present invention can be fully utilized. The porous nature of the PEDOT shell allows such fast ion diffusion into the core $MnO_2$ of the coaxial nanowires. In addition, the highly electrical conductive PEDOT shell facilitates electron transport to the core $MnO_2$, which has low conductivity (Desilvestro, J. et al. (1990) "*Metal Oxide Cathode Materials for Electrochemical Energy Storage: A Review*," J. Electrochem. Soc. 137:C5-C22) that can limit its charge/discharge rate (Chang, J. K. et al. (2003) "*Material Characterization and Electrochemical Performance of Hydrous Manganese Oxide Electrodes for Use in Electrochemical Pseudocapacitors*," J. Electrochem. Soc. 150: A1333-A1338; Wu, M. S. et al. (2004) "*Fabrication of Nanostructured Manganese Oxide Electrodes for Electrochemical Capacitors*," J. Electrochem. Solid-State Lett. 7:A123-A126) (see description relating to cyclic voltammogram in Example 1). It also explains the significant decrease of specific capacitance of pure $MnO_2$ nanowires. With regard to mechanical stability, the solid core $MnO_2$ and the flexible PEDOT shell prevent, synergistically, the coaxial nanowires from significant collapsing and breaking after removal of the template and the drying process that downgrades their electrochemical performance (see Example 1).

In conclusion, $MnO_2$/PEDOT coaxial nanowires were fabricated by a one-step coelectrodeposition method. The structures of the coaxial nanowires could be controlled by applied potential. The combination of $MnO_2$ and PEDOT into 1D nanostructures showed excellent electrochemical and mechanical properties for energy storage applications.

EXAMPLE 3

Poly(3,4-ethylenedioxythiophene) Nanotubes as Electrode Materials for a High-Powered Supercapacitor The supercapacitive properties of the PEDOT nanotube arrays of the present invention, electrochemically synthesized in the cylindrical pores of an alumina template membrane, were investigated.

The micron-long, thin-walled nanotubular structures of such arrays enable one to develop a supercapacitor exhibiting both a high power density and high energy density (or specific capacitance). An alumina membrane is used as the template to direct the growth of PEDOT nanotubes owing to advantages in tailoring the diameter and length of desirable nanomaterials. The PEDOT nanostructures were synthesized by an electrochemical method rather than a chemical one to provide higher conductivity (Heywang et al. (1992) "*Poly(alkylenedioxythiophene)s—New, Very Stable Conducting Polymers*," Adv. Mater. 4:116-118; Martin C. R. (1995) "*Template Synthesis of Electronically Conductive Polymer Nanostructures*," Acc. Chem. Res. 28:61-68). Cyclic voltammetry was used to characterize the specific capacitance and rate capability of the PEDOT-nanotube-based electrodes. The energy densities and power densities were evaluated by galvanostatic charge/discharge cycling for the supercapacitor with two symmetric PEDOT-nanotube-based electrodes. All the electrochemical tests on the nanotube array were performed without removing the template, which offers the following advantages: first, the alumina template can directly serve as a substrate to support the electrode materials; second, the alumina template can be used as a separator between the electrodes, and the porous channels can store the electrolyte; third, the electrode materials are well protected inside the alumina pores to prevent nanostructure aggregation and electrode surface damage. Finally, impedance spectroscopy was used to investigate the diffusion resistance of the PEDOT nanotubes.

EXPERIMENTAL DETAILS

Chemicals and materials: 3,4-ethylenedioxythiophene (EDOT), lithium perchlorate and anhydrous propylene carbonate were purchased from Sigma Aldrich (Milwaukee, Wis.). Tetraethylammonium tetrafluoroborate ($Et_4NBF_4$) (electrochemical grade) was obtained from Fluka (Switzerland). Acetonitrile was obtained from Fisher Scientific (Fair Lawn, N.J.). Gold plating solution (Orotemp 24) was from Technic (Cranston, R.I.). De-ionized water (about 18MΩ $cm^{-1}$ in resistivity) was made by a Milli-Q water purification system (Millipore; Dubuque, Iowa). Alumina membranes of 200 nm in pore diameter and 60 μm in thickness are commercially available from Whatman (Clifton, N.J.).

Synthesis: PEDOT nanotubes were synthesized potentiostatically at 1.6 V in an acetonitrile solution of 20 mM EDOT, while PEDOT nanowires were made at 1.4 V in 100 mM EDOT. All electrode potentials were measured relative to an Ag/AgCl reference electrode using a Pt foil as a counter-electrode, if not specified otherwise. The preparation of a working electrode is as follows: A thin layer of gold (about 500 nm) was sputtered onto the branched side of an alumina membrane using a sputtering system (Denton Vacuum Desktop III). The Au-coated membrane was connected to an electrical circuit using a copper tape from 3M (St Paul, Minn.). An electroactive window (0.32 $cm^2$ in nominal area) was defined using Parafilm. Considering the porosity of a membrane (60%), the corrected surface area of the electroactive window was 0.2 $cm^2$. For the synthesis of PEDOT nanowires, flat-top electrodes at the bottom of the pores were prepared by further electrodepositing gold galvanostatically at 1.0 mA $cm^{-2}$ for 15 min in gold plating solution. The mass of the resulting PEDOT nanostructures was controlled by fixing the total charges passed during the electropolymerization.

Characterizations: The PEDOT nanostructures were investigated using a field emission scanning electron microscope (SEM; Hitachi S-4700, operated at an acceleration voltage of 5 keV) and a transmission electron microscope (TEM; Zeiss EM10CA, operated at 80 keV). The sampling methods for SEM and TEM analysis were described in detail previously (Cho et al. (2005) "*Nanotube-Based Ultrafast Electrochromic Display*," Adv. Mater. 17:171-175; Cho et al. (2005) "*Electrochemical Synthesis and Fast Electrochromics of Poly (3,4-ethylenedioxythiophene) Nanotubes in Flexible Substrate*," Chem. Mater. 17:4564-4566). Briefly, the gold-coated side of a small piece of an alumina template was tightly attached onto an SEM specimen holder using a carbon tape. The template was dissolved in 3 M NaOH to expose the nanomaterials. After rinsing them with de-ionized water repeatedly, the samples were dried in air before observation. For TEM sampling, the gold layer was removed by using an aqua regia solution after growing the desired nanostructures in a gold-coated alumina template. The alumina template was dissolved in 3 M NaOH. The released nanomaterials were repeatedly rinsed with de-ionized water and ethanol. Then, 6 μl of the nanomaterial solution was dropped and dried on a TEM grid.

Cyclic voltammetry was performed in a potential range between 0 and 1.2 V at various scan rates of 10-1000 mV $s^{-1}$ in 1 M $LiClO_4$ using the three-electrode system. A type I supercapacitor was built by assembling two PEDOT-nanotube-based electrodes with electrolyte (1 M $Et_4NBF_4$ in propylene carbonate) into an electrochemical cell. Galvanostatic charge/discharge curves for the type I supercapacitor were obtained by cycling the potential from 0 to 1.2 V. All the above electrochemical experiments were performed using a bi-potentiostat (BI-STAT; Princeton Applied Research). The impedance measurement was carried out using a potentiostat (CHI 660A) at 0 V (versus Ag/AgCl) with a perturbation amplitude of 5 mV over a frequency range 0.01-104 Hz.

Results and Discussion

Structure Characterization And Basic Growth Mechanism: Controlling the total charge during electropolymerization properly regulates the amount of PEDOT loaded in the pores of the template. By depositing PEDOT with a charge density of 500 mC cm$^{-2}$, a mass loading of about 0.3 mg cm$^{-2}$ was obtained. PEDOT can be electrodeposited up to 3 C cm$^{-2}$ (PEDOT starts to grow out of the membrane beyond 3 C cm$^{-2}$), which gives 1.8 mg cm$^{-2}$ mass loading. By stacking the alumina membranes, higher mass loading can be achieved. The total charge dependence of PEDOT nanostructures is complicated because not only the length but also because the wall thickness of the nanotubes is affected by the total charge. A previous mechanism study showed that nanotubes grow at high overpotentials (>1.4 V) at low monomer concentrations (<50 mM). The SEM images of PEDOT nanotubes have a similar appearance as before: highly collapsed and aggregated structures (Xiao et al. (2007) "*Controlled Electrochemical Synthesis of Conductive Polymer Nanotube Structures*," J. Am. Chem. Soc. 129:4483-4489), which are caused by the intensive aggregation of nanostructures at their tops driven by the strong surface tension generated at the interface between the nanotubes and solvent during the solvent evaporation (Wirtz et al. (2002) "*Template-Synthesized Nanotubes for Chemical Separations and Analysis*," Chem. Eur. J. 8:3572-3578). These structural defects can affect the charge/discharge performance of nanostructured electrode materials due to hindered diffusion of counter-ions. However, such structural defects of nanostructures can be avoided in accordance of the present invention since the electrochemical tests were performed under the support of a rigid template.

Figure 12:
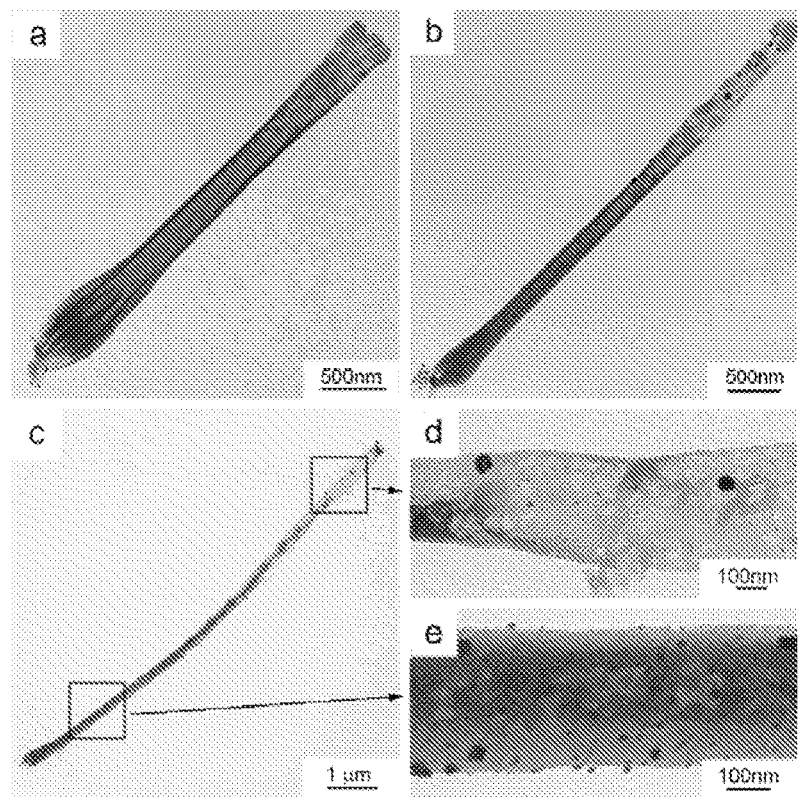
FIG. 12 (Panels a-e) show TEM images of PEDOT nanotubes synthesized in 20 mM EDOT at 1.6 V with a charge density of 200 (Panel a), 300 (Panel b) and 500 (Panel c) mC cm$^{-2}$. Panel d and Panel e are magnified images showing the detailed nanostructure.

The detailed nanostructures were investigated as a function of charge density in order to understand the capacitive properties. FIG. 12 (Panels a-e) show TEM images of PEDOT nanotubes synthesized in 20 mM EDOT at 1.6 V for a total charge density of 200, 300 and 500 mC cm$^{-2}$, which correspond to 40±5, 60±5 and 110±5 s of electropolymerization time, respectively. Nanotubes with thin, uniform, and smooth walls were grown along the template pore at the beginning (FIG. 12 (Panel a)). As the total charge was increased further, the nanotube length increased in proportion while the wall thickness and porosity changed in a complicated way. For example, nanotubes with gradually thinning walls along the nanotube axis (rather than ones with uniform wall thickness) were obtained at the total charge density of 300 mC cm$^{-2}$ (FIG. 12 (Panel b)). This can be attributed to the gradually decreasing monomer supply at the tips of the nanotubes during their growth, resulting from fast monomer depletion when the PEDOT is electropolymerized at lower monomer concentration and higher overpotential. Under the same conditions, it was found that the upper part of the nanotubes became more porous with increased charge density (FIG. 12). This porous, loose structure at higher oxidative overpotentials was also observed in a film by Niu et al. (2001) ("*Electrochemically Controlled Surface Morphology And Crystallinity In Poly*(3, 4-*Ethylenedioxythiophene*) *Films*," Synth. Met. 122:425-429). The limited monomer supply also revealed why the bottom of the nanotubes was porous (distinct from the solid nanowires) even though they were filled at the high charge density of 500 mC cm$^{-2}$ (FIG. 12 (Panel e)).

Electrochemical characterizations: The electrochemical performances were tested for the PEDOT nanotubes electropolymerized at the various total charge densities of 100, 200, 300, 400, and 500 mC cm$^{-2}$. The best electrochemical performances for fast switching between redox states were obtained from the nanotubes with lowest total charge density (100 mC cm$^{-2}$) because of the facile electrochemistry caused by their thin wall structures. However, the mass loading at the lowest charge density was too limited to provide high mass loading, which is required to achieve high capacitance. Therefore, electrochemical experiments were performed at the charge density of 500 mC cm$^{-2}$ if not specified otherwise. For notational convenience, nanotubes with total charge density of 500 mC cm$^{-2}$ are termed herein "NT 500", and do likewise for other charge densities.

Cyclic voltammetry (CV) was used to characterize the capacitive properties of the PEDOT nanostructures. The pseudocapacitance behaviour of PEDOT is originated from diffusion of charged counter-ions (here, ClO$^{-4}$) during the redox processes, as shown below, with the counter-ion represented "A$^-$":

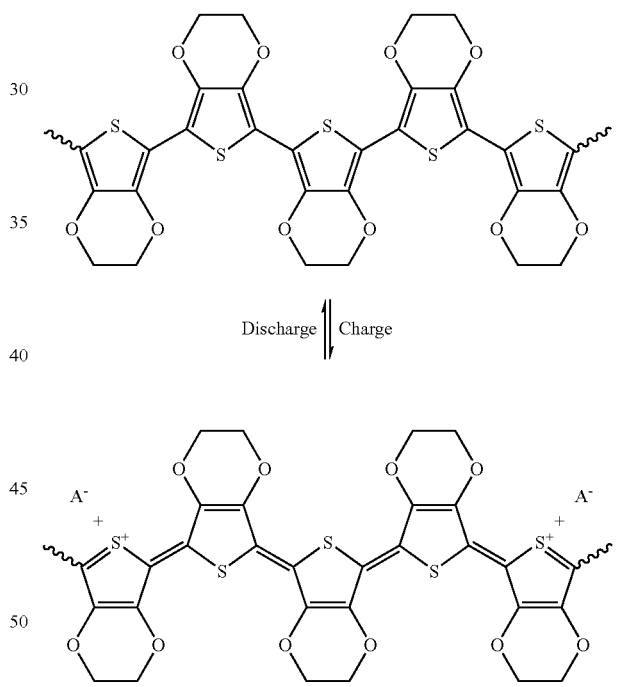

Figure 13:
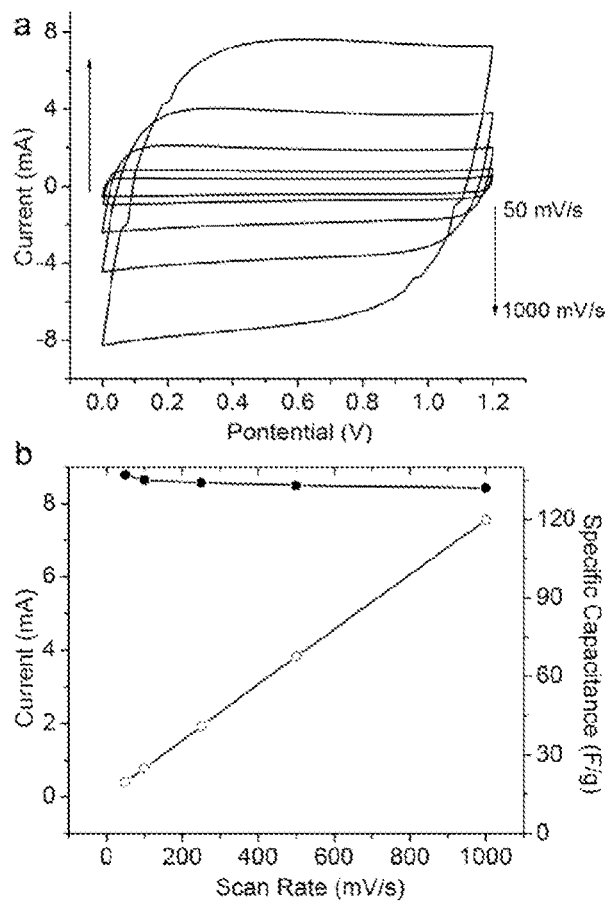
FIG. 13 (Panels a-b) show cyclic voltammograms (Panel a) of NT 500 at the different scan rates of 50, 100, 250, 500 and 1000 mV s$^{-1}$ in a potential range between 0 and 1.2 V. The arrow points in the direction of scan rate increase and plots of the average anodic current (Panel b; open circle) and specific capacitance (Panel b; closed circle) versus scan rate.

All cyclic voltammetric scans were performed in a potential range from 0 to 1.2 V, within which high conductivity and good electrochemical reversibility of PEDOT can be maintained (Groenendaal et al. (2003) "*Electrochemistry of Poly* (3,4-*alkylenedioxythiophene*) *Derivatives*," Adv. Mater. 15:855-879). FIG. 13 (Panel a) shows the cyclic voltammograms of NT 500 at different scan rates of 50, 100, 250, 500 and 1000 mV s$^{-1}$. The shape of the CV plot of PEDOT nanotubes closely resembles a rectangle even at the high scan rate of 1000 mV s-1, showing its ideal capacitor behaviour. Furthermore, the resulting anodic current in nanotubes increases in proportion to the scan rate, as shown in FIG. 13 (Panel b). This helps to achieve a constant specific capacitance, which is independent of the scan rate, as expected by the following equation:

$$C_{spec} = \frac{i}{m_e \frac{\Delta V}{\Delta t}} \qquad \text{Equation 1}$$

where, $C_{spec}$ is the specific capacitance in F g$^{-1}$, i is the charge/discharge current in mA, $m_e$ is the weight of one electrode material (PEDOT weight) in mg, and $\Delta V/\Delta t$ is the scan rate in V s$^{-1}$. The specific capacitance for NT 500 is approximately 140 F g$^{-1}$, calculated using a current of about 0.8 mA from the CV plot in FIG. 13 (Panel b), $m_e$ of 5.72× 10$^{-2}$ mg and scan rate of 100 mV s$^{-1}$. This value is satisfactory and comparable to that in previous works (Lota et al. (2004) "*Capacitance Properties Of Poly(3,4-ethylenedioxythiophene)/Carbon Nanotubes Composites*," J. Phys. Chem. Solids 65:295-301; Li et al. (2005) "*Application Of Ultrasonic Irradiation In Preparing Conducting Polymer As Active Materials For Supercapacitor*," Mater. Lett. 59:800-803; Jang et al. (2006) "*Selective Fabrication of Poly(3,4-ethylenedioxythiophene) Nanocapsules and Mesocellular Foams Using Surfactant-Mediated Interfacial Polymerization*," Adv. Mater. 18:354-358). Compared to the theoretical maximum specific capacitance of PEDOT (about 200 F g$^{-1}$), which is determined by the molecular weight of polymer (142 g mol$^{-1}$) and the doping level of counter-ions (0.3) (Randriamahazaka et al. (1999) "*Nucleation And Growth Of Poly(3,4-Ethylenedioxythiophene) In Acetonitrile On Platinum Under Potentiostatic Conditions*," J. Electroanal. Chem. 472:103-111), the specific capacitance here is around its 70%.

Figure 14:
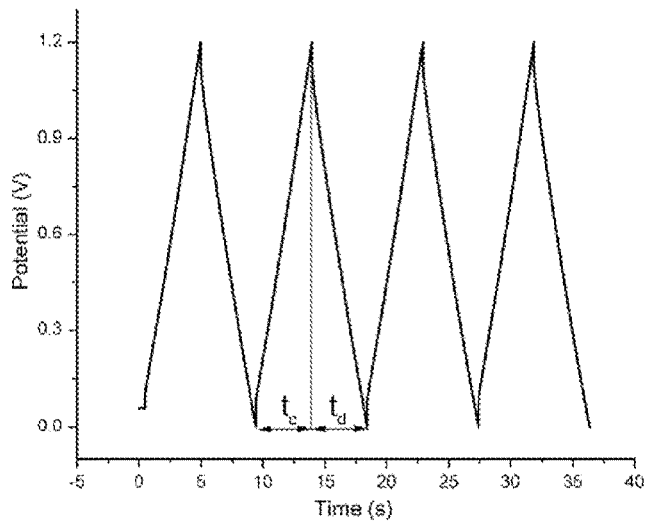
FIG. 14 shows galvanostatic charge/discharge curves of supercapacitors made of NT 500. Potentials were cycled from 0 to 1.2 V at a current density of 5 mA cm$^{-2}$ in an acetonitrile solution of 1 M $LiClO_4$. $t_c$ and $t_d$ represent charge time and discharge time respectively.
Figure 15:
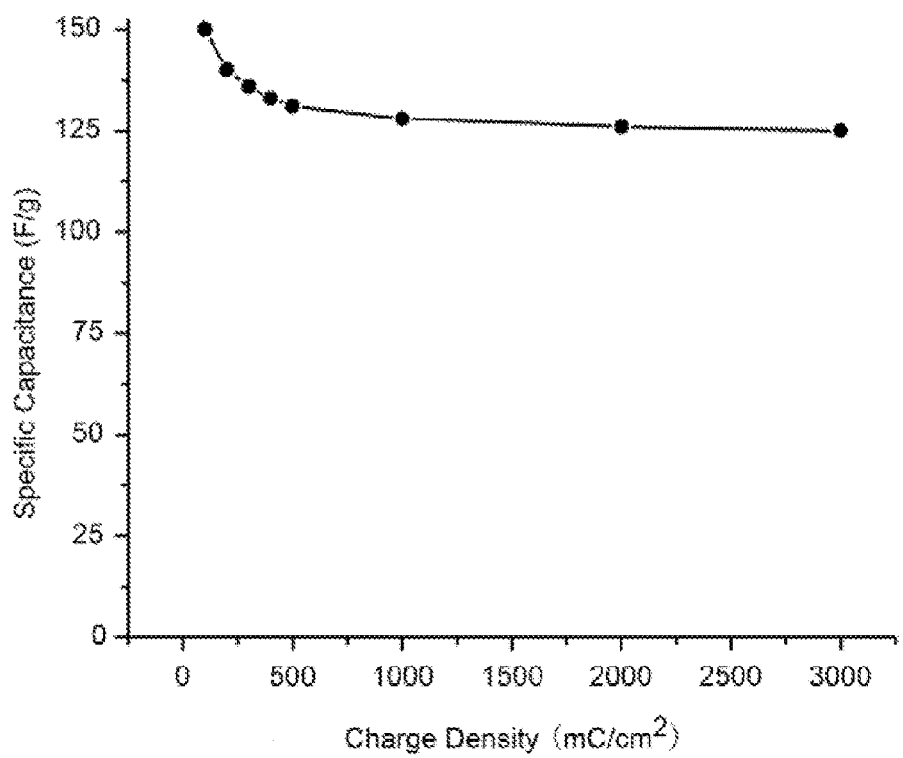
FIG. 15 shows specific capacitances of type I supercapacitors based on PEDOT nanotubes synthesized at various total charge densities (100, 200, 300, 400, 500, 1000, 2000 and 3000 mC cm$^{-2}$).

Conductive polymer based supercapacitors can be classified into three types (Rudge et al. (1994) "*Conducting Polymers As Active Materials In Electrochemical Capacitors*," J. Power Sources 47:89-107). Type I is a symmetric system using a p-dopable conductive polymer as each electrode of the capacitor. Type II is an asymmetric system based on two different p-dopable conducting polymers. Type III is a symmetric system based on a conducting polymer which can be both p- and n-doped. Due to the reported difficulties of n doping for PEDOT (Ahonen et al. (2000) "*n- and p-Doped Poly(3,4-ethylenedioxyphene):Two Electronically Conducting States of the Polymer*," Macromolecules 33:6787-6793), a type I supercapacitor was built using two identical electrodes with PEDOT nanotubes. Galvanostatic charge/discharge cycles were performed to evaluate the power density and energy density of PEDOT-nanotube-based supercapacitors. Here, only the weight of electroactive polymers is taken into account. FIG. 14 shows the galvanostatic charge/discharge curves of PEDOT-nanotube-based supercapacitors at the current density of 5 mA cm$^{-2}$. As expected, the galvanostatic measurements agreed well with the CV studies: the nanotubes produced linear and symmetrical curves, and the specific capacitances of PEDOT-nanotube-based supercapacitors from FIG. 14 are 132 F g$^{-1}$. This high linearity and symmetry in the galvanostatic charge/discharge curve of a nanotube-based supercapacitor indicate high charge/discharge efficiency ($\eta$) of 99.5%, which is the ratio of discharge time $t_d$ and charge time $t_c$. The slower potential change rate, $\Delta V/\Delta t$, indicates higher specific capacitance according to Equation 1. FIG. 15 shows the summarized specific capacitances of supercapacitors made of nanotubes which were synthesized at the various electropolymerization charges (100, 200, 300, 400, 500, 1000, 2000 and 3000 mC cm$^{-2}$). The specific capacitance for nanotubes decreased less than 20% when the electropolymerization charge density was increased from 100 to 3000 mC cm$^{-2}$. This small decrease in the specific capacitance at the high electropolymerization charge indicates that the conductive polymers are effectively charged and discharged independently of the nanotube lengths.

As in a conventional battery, the maximum power ($P_{max}$) that can be delivered by a supercapacitor is given by:

$$P_{max} = \frac{V^2}{4R} \qquad \text{Equation 2}$$

where V is the potential range for the charge/discharge cycling in V and R is the equivalent series resistance (ESR) in ohms. In order to maximize the deliverable power, many efforts have been made to minimize the ESR (Niu et al. (1997) "*High Power Electrochemical Capacitors Based On Carbon Nanotube Electrodes*," Appl. Phys. Lett. 70:1480-1482; An et al. (2001) "*Supercapacitors Using Single-Walled Carbon Nanotube Electrodes*," Adv. Mater. 13:497-500; Du et al. (2005) "*High Power Density Supercapacitors Using Locally Aligned Carbon Nanotube Electrodes*," Nanotechnology 16:350-353). Practically, however, high power requires a fast charge/discharge rate and is always accompanied by the loss of usable energy, especially in a redox supercapacitor because of the incomplete utilization of redoxactive materials. Thus, the efficient use of the materials is an important issue in achieving the optimal high power density while maintaining a high energy density.

The energy density ($E_d$ in W h kg$^{-1}$) of a symmetric supercapacitor at a constant current is expressed as:

$$E_d = \frac{i \int V dt}{m_{total}} \qquad \text{Equation 3}$$

where $m_{total}$ is the total mass of two electrode materials (2 $m_e$). When the voltage is varies linearly from 0 to $V_{max}$ over time, in a type I supercapacitor, Equation 3 becomes:

$$E_d = \frac{1}{8} C_{spec} V_{max}^2 \qquad \text{Equation 4}$$

This is also used in calculating the energy density (Zheng J. P. (2005) "*Theoretical Energy Density for Electrochemical Capacitors with Intercalation Electrodes*," J. Electrochem. Soc. 152:A1864-A1869).

The power density ($P_d$ in kW kg$^{-1}$) can be calculated as:

$$P_d = \frac{E_d}{t_d} \qquad \text{Equation 5}$$

Figure 16:
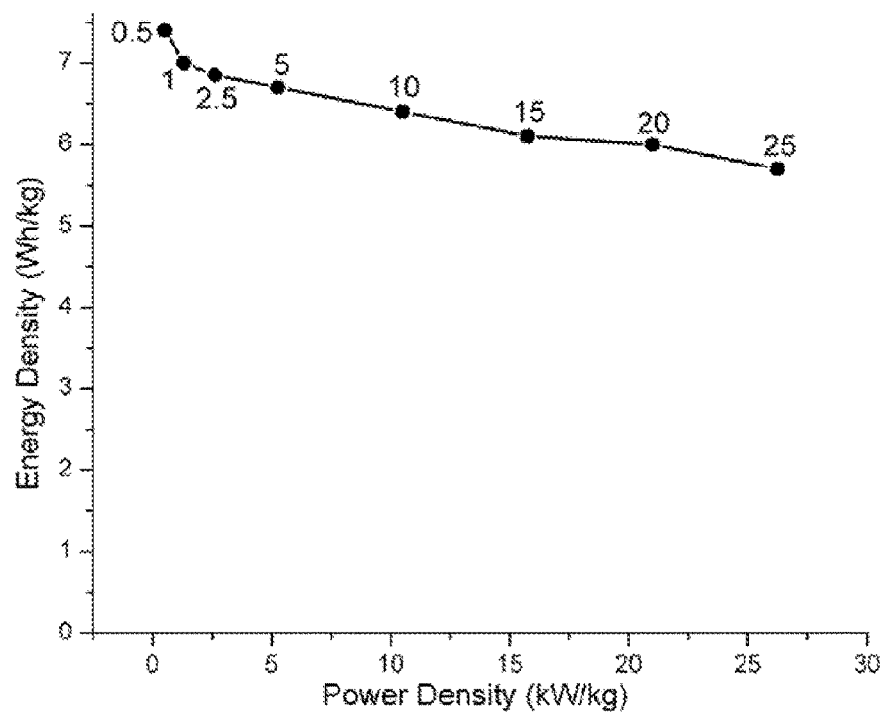
FIG. 16 shows a plot of energy density versus power density (Ragone plot) for a type I supercapacitor made of NT 500. The inserted numbers represent the current densities (mA cm$^{-2}$) for the charge/discharge.

The experimental values for $P_d$ and $E_d$ were obtained by analyzing the charge/discharge curve of PEDOT nanostructures at various current densities. FIG. 16 shows the plot of Ed versus Pd, known as a Ragone plot, for a type I supercapacitor made of NT 500. Nanotube-based supercapacitors can maintain at least 80% of their energy densities (5.6 W h kg$^{-1}$) and specific capacitance (120 F g$^{-1}$) even when the power density increases from 5 to 25 kW kg$^{-1}$. The power density (specific power) obtained by this PEDOT-nanotube-based supercapacitor is higher than that of previously reported PEDOT and other conductive polymer film based supercapacitors (Ferraris et al. (1998) "*Performance Evaluation of Poly 3-(Phenylthiophene) Derivatives as Active Materials for Electrochemical Capacitor Applications*," Chem. Mater. 10:3528-3535; Prasad et al. (2002) "*Electrochemical Studies of Polyaniline in a Gel Polymer Electrolyte*," Electrochem. Solid-State Lett. 5:A271-A274; Laforgue et al. (2003) "*Activated Carbon/Conducting Polymer Hybrid Supercapacitors*," J. Electrochem. Soc. 150:A645-A651; Bélanger et al. (2000) "*Characterization and Long-Term Performance of Polyaniline-Based Electrochemical Capacitors*," J. Electrochem. Soc. 147:2923-2929; Fusalba et al. (2001) "*Electrochemical Characterization of Polyaniline in Nonaqueous Electrolyte and Its Evaluation as Electrode Material for Electrochemical Supercapacitors*," J. Electrochem. Soc. 148:A1-A6; Kim et al. (2002) "*An All-Solid-State Electrochemical Supercapacitor Based on Poly3-(4-fluorophenylthiophene) Composite Electrodes*," J. Electrochem. Soc. 149:A1376-A1380; Fusalba et al. (2000) "*Poly(Cyano-Substituted Diheteroareneethylene) as Active Electrode Material for Electrochemical Supercapacitors*," Chem. Mater. 12:2581-2589; Prasad et al. (2002) "*Potentiodynamically Deposited Polyaniline on Stainless Steel*," J. Electrochem. Soc. 149:A1393-A1399; Gupta et al. (2005) "*Electrochemically Deposited Polyaniline Nanowire's Network*," Electrochem. Solid-State Lett. 8:A630-A632; Mastragostino et al. (2000) "*Polymer Selection and Cell Design for Electric-Vehicle Supercapacitors*," J. Electrochem. Soc. 147:407-412; Soudan et al. (2001) "*Chemical Synthesis and Electrochemical Properties of Poly (cyano-substituted-diheteroareneethylene) as Conducting Polymers for Electrochemical Supercapacitors*," J. Electrochem. Soc. 148:A775-A782; Villers et al. (2003) "*The Influence of the Range of Electroactivity and Capacitance of Conducting Polymers on the Performance of Carbon Conducting Polymer Hybrid Supercapacitor*," J. Electrochem. Soc. 150:A747-A752; Laforgue et al. (2001) "*Hybrid Supercapacitors Based on Activated Carbons and Conducting Polymers*," J. Electrochem. Soc. 148:A1130-A1134).

Reports have demonstrated that energy densities decrease dramatically when the power density is boosted less than 10 kW kg$^{-1}$ (Ferraris et al. (1998) "*Performance Evaluation of Poly 3-(Phenylthiophene) Derivatives as Active Materials for Electrochemical Capacitor Applications*," Chem. Mater. 10:3528-3535; Prasad et al. (2002) "*Electrochemical Studies of Polyaniline in a Gel Polymer Electrolyte*," Electrochem. Solid-State Lett. 5:A271-A274; Laforgue et al. (2003) "*Activated Carbon/Conducting Polymer Hybrid Supercapacitors*," J. Electrochem. Soc. 150:A645-A651). Therefore, a nanotubular structure is an excellent candidate to provide high power density with less loss of energy density as a supercapacitor. The energy density of the system is comparable to the one from the work that uses similar type I (Bélanger et al. (2000) "*Characterization and Long-Term Performance of Polyaniline-Based Electrochemical Capacitors*," J. Electrochem. Soc. 147:2923-2929; Fusalba et al. (2001) "*Electrochemical Characterization of Polyaniline in Nonaqueous Electrolyte and Its Evaluation as Electrode Material for Electrochemical Supercapacitors*," J. Electrochem. Soc. 148:A1-A6) or even type III supercapacitors (Ferraris et al. (1998) "*Performance Evaluation of Poly 3-(Phenylthiophene) Derivatives as Active Materials for Electrochemical Capacitor Applications*," Chem. Mater. 10:3528-3535; Kim et al. (2002) "*An All-Solid-State Electrochemical Supercapacitor Based on Poly3-(4-fluorophenylthiophene) Composite Electrodes*," J. Electrochem. Soc. 149: A1376-A1380; Fusalba et al. (2000) "*Poly(Cyano-Substituted Diheteroareneethylene) as Active Electrode Material for Electrochemical Supercapacitors*," Chem. Mater. 12:2581-2589) design. However, based on Equation 4, higher energy density can be obtained using different conductive polymers that have high specific capacitance (Prasad et al. (2002) "*Potentiodynamically Deposited Polyaniline on Stainless Steel*," J. Electrochem. Soc. 149:A1393-A1399; Gupta et al. (2005) "*Electrochemically Deposited Polyaniline Nanowire's Network*," Electrochem. Solid-State Lett. 8:A630-A632). Also, designing a supercapacitor with higher voltage range can help to achieve higher energy density according to Equation 4 (Mastragostino et al. (2000) "*Polymer Selection and Cell Design for Electric-Vehicle Supercapacitors*," J. Electrochem. Soc. 147:407-412; Soudan et al. (2001) "*Chemical Synthesis and Electrochemical Properties of Poly(cyano-substituted-diheteroareneethylene) as Conducting Polymers for Electrochemical Supercapacitors*," J. Electrochem. Soc. 148:A775-A782; Villers et al. (2003) "*The Influence of the Range of Electroactivity and Capacitance of Conducting Polymers on the Performance of Carbon Conducting Polymer Hybrid Supercapacitor*," J. Electrochem. Soc. 150:A747-A752; Laforgue et al. (2001) "*Hybrid Supercapacitors Based on Activated Carbons and Conducting Polymers*," J. Electrochem. Soc. 148:A1130-A1134). One approach is to build a type III supercapacitor because additional voltage range can be obtained from the n-doping region (Mastragostino et al. (2000) "*Polymer Selection and Cell Design for Electric-Vehicle Supercapacitors*," J. Electrochem. Soc. 147:407-412; Soudan et al. (2001) "*Chemical Synthesis and Electrochemical Properties of Poly(cyano-substituted-diheteroareneethylene) as Conducting Polymers for Electrochemical Supercapacitors*," J. Electrochem. Soc. 148: A775-A782). Another solution is to build a hybrid-type supercapacitor, i.e. using a suitable material such as activated carbon (Villers et al. (2003) "*The Influence of the Range of Electroactivity and Capacitance of Conducting Polymers on the Performance of Carbon Conducting Polymer Hybrid Supercapacitor*," J. Electrochem. Soc. 150:A747-A752; Laforgue et al. (2001) "*Hybrid Supercapacitors Based on Activated Carbons and Conducting Polymers*," J. Electrochem. Soc. 148:A1130-A1134) that can store electrochemical energy under negative potentials as the counter-electrode to the conductive polymer.

Mechanism Of Fast Charge/Discharge Behaviour In Nanotubes: The charge/discharge process of a PEDOT-based supercapacitor is different from that of an EDLC: the PEDOT-based supercapacitor uses the redox reaction of PEDOT while the EDLC utilizes the electrostatic charges built on the electrode surface. PEDOT-based supercapacitors require the diffusion of counter-ions into/out of the polymer (doping and dedoping of conductive polymer) to balance the charges generated during the redox reaction. The criterion for a PEDOT-based supercapacitor to exhibit ideal capacitor behaviour is that the doping/dedoping rates should be fast enough to provide constant current during the redox reaction. This doping/dedoping process involves not only charge (electrons or holes) transport but also ion transport. Here, the ion transport rate determines the charge/discharge rate of PEDOT because it is slow compared to charge transport. The ion transport rate, limited by the diffusion of counter-ions, is greatly influenced by the thickness of the polymer layer. A thinner film has a lower resistance to counter-ion diffusion due to its shortened diffusion distance. Therefore, thinner film can charge/discharge counter-ions more efficiently at a given current. In other words, the voltage change rate, $\Delta V/\Delta t$, in a thin film is smaller than in a thick one to provide constant current. This leads to a higher specific capacitance in the thin film, as shown in Equation 1.

Figure 17:
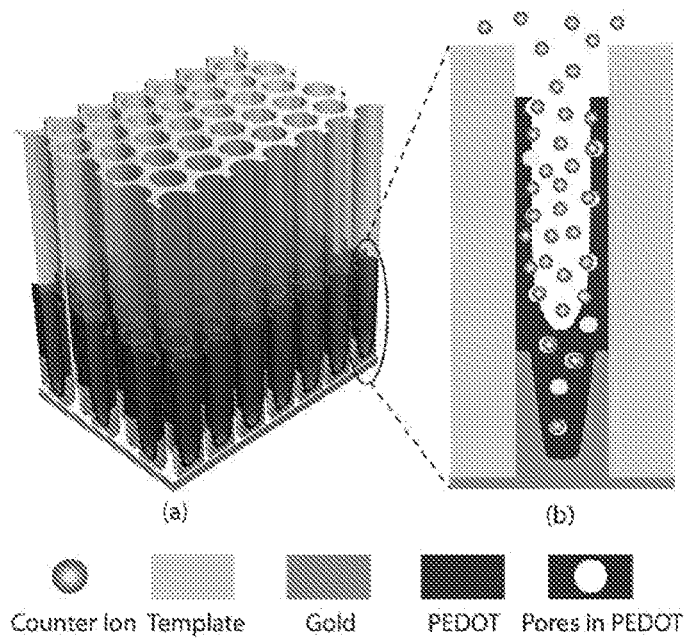
FIG. 17 (Panels a and b) show representations of the coaxial nanowire array of the present invention with template (Panel a: Electrode made of PEDOT nanotubes in a porous alumina template for a supercapacitor and of ion transport (Panel b) (doping or charging) in a single nanotube. Complete and fast doping of anions can be achieved in the PEDOT nanotubes because of their short diffusion distance and high porosity.

Examining a single nanotube of the nanotube array, as illustrated in FIG. 17, the hollow nature of the nanotube allows the electrolyte ions to penetrate into the polymer and access the internal polymer surface easily. Because the thickness of the nanotube wall can be approximated by the film thickness, it is natural that NT 100 and NT200 can have the highest specific capacitance values (FIG. 15). It is also notable that the specific capacitance change as a function of charge density (up to 500 mC cm$^{-2}$) is not significant in a nanotubular structure (FIG. 15). This can be well understood by taking into account the structure of NT 500, which still has thin walls at the top and porous structures at the bottom (FIG. 12 (Panel d and Panel e) and FIG. 17).

Figure 18:
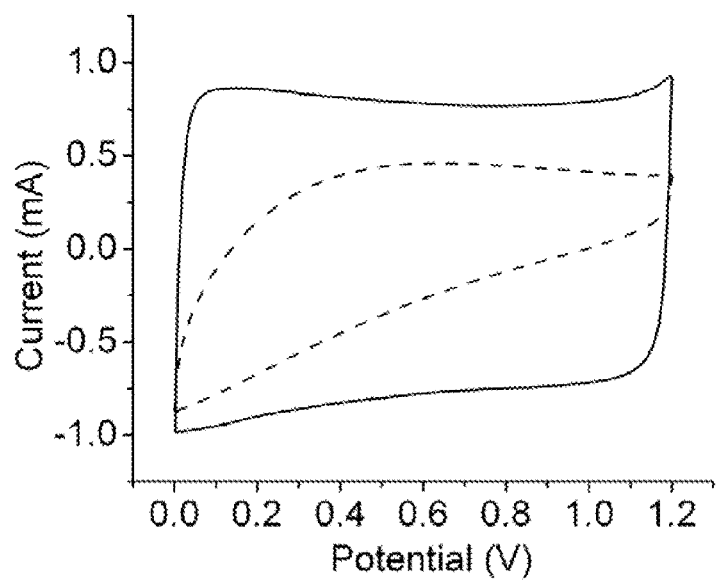
FIG. 18 shows a cyclic voltammogram of solid nanowires (charge density 500 mC cm$^{-2}$) shielded (dashed line) and unshielded (solid line) by an alumina template at the scan rate of 100 mV s$^{-1}$ in a potential range between 0 and 1.2 V.

In order to investigate the mechanism of fast charge/discharge of the nanotubes, the electrochemical properties of solid nanowires protected by the alumina template was studied. Solid nanowires were grown on the gold flat-top electrode at 1.4 V in 100 mM EDOT solution. The charge density of solid nanowires was controlled to be the same as in NT 500. Such solid nanowires are denoted as NW 500, etc. FIG. 18 shows that solid nanowires shielded by alumina template have much less capacitive current compared to the NT 500 at the same scan rate (FIG. 13). The specific capacitance estimated based on average current density is only 50 F g$^{-1}$. In addition, it has a significantly distorted rectangular shape that corresponds to the deviated potential-dependent capacitive behavior (non-ideal capacitive behavior). This can be explained as follows. First, nanowires have a denser and more rigid structure (higher diffusional resistance) than hollow nanotubes. Second, the side wall of the nanowires is completely shielded by a template, so the diffusion of counter-ions is only allowed from the tops of the nanowires. Here, the diffusion length of counter-ions corresponds to the lengths of nanowires (equivalent to the thickness of dense bulk film). Thus, the counter-ion transport in the dense and long nanowires is very sluggish, and only some part of the nanowire is involved in the charge/discharge process at the high scan rate or current. After template removal, however, the capacitive current increased significantly, and is comparable to that of the nanotubes (FIG. 13 and FIG. 18). In addition, the rectangle-like shape also indicated better capacitive properties. This is because the cylindrical side of the nanowires can be accessed by the electrolyte after the template has been removed. However, after template removal, the exposed nanostructures are subject to be lost and damaged mechanically without the template protection (Li et al. (2000) "Rate Capabilities of Nanostructured LiMn2O4 Electrodes in Aqueous Electrolyte," J. Electrochem. Soc. 147:2044-2049). The thin conductive substrate (sputtered metal) may easily crack after wetting and drying, which will affect the electrochemical performance. The above facts indicate that the nanotubes indeed take advantage of their internal surface to allow ion transport owing to their unique hollow nature.

Figure 19:
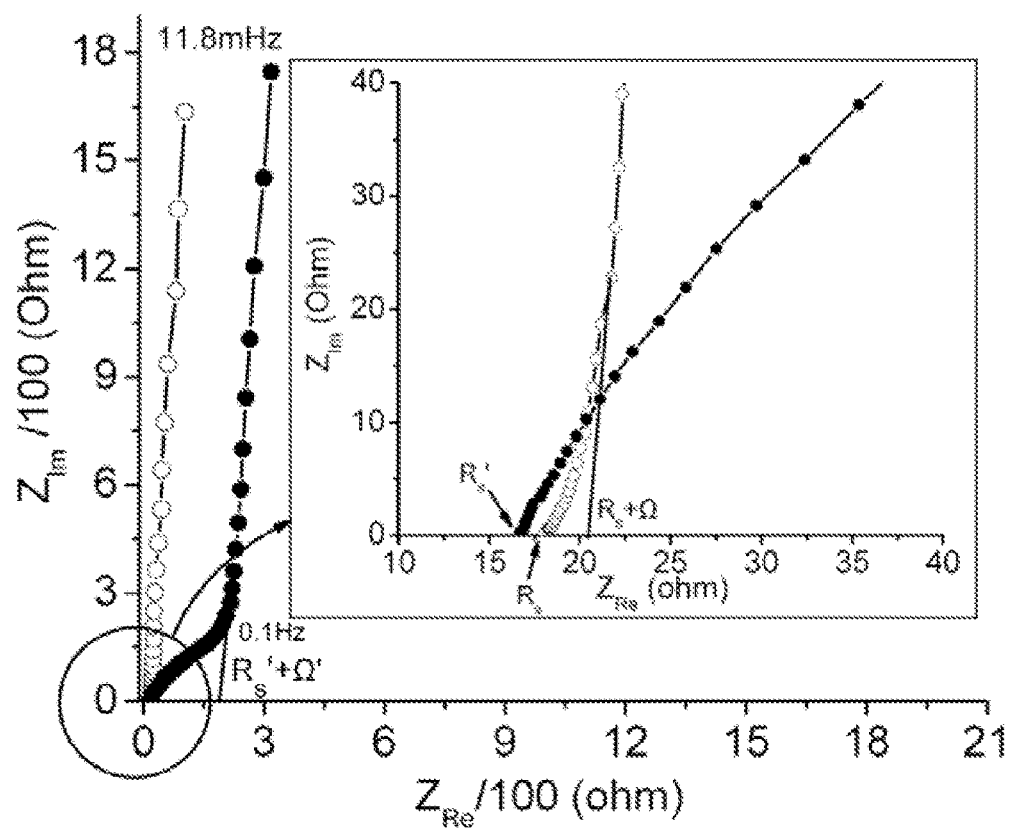
FIG. 19 shows an impedance plot of NT 500 (open circle) and NW 500 (closed circle) in a frequency range between 0.01 and 10⁴ Hz. The x-intercepts (R, and R',) in the inset represent the solution resistance, while Ω and Ω' represent one-third of the ionic resistance caused by the diffusion.

Electrochemical AC Impedance Spectroscopy: To support such an explanation, AC impedance spectroscopy was employed. AC impedance spectroscopy is a tool for studying the ion transport occurring during the doping/dedoping process. FIG. 19 shows the impedance plots of PEDOT nanostructures recorded using a perturbation amplitude of 5 mV in a frequency range from 10$^4$ to 0.01 Hz at the applied voltage of 0 V versus Ag/AgCl. The employed electrochemical system has finite nanostructured electrodes in template pores and can be described by using the 'classical' finite-length transmission line model developed by Barsoukov et al. (2005) (In: Impedance Spectroscopy: Theory, Experiment, and Applications 2nd ed. (New Jersey: Wiley) p 27). The useful electrochemical information can be extracted from the impedance plot in FIG. 19 by considering the limiting behaviour at high and low frequencies. At the high-frequency region, it is hard to observe a well-defined semicircle. This indicates that the charge transfer resistance is small, and that the employed electrochemical system is kinetically fast. Thus, charges (electrons) can be readily transferred into the highly conductive PEDOT solid phase. This favourable charge transfer between the PEDOT and electrode surface is natural because the PEDOT was grown electrochemically in good contact with the base electrode. The x-intercepts provide quantitative information on the effective internal resistances, $R_s$, mostly contributed by the uncompensated solution resistance. Since the same electrolyte solution was employed, the $R_s$ values for NT 500 and NW 500 systems are very close (18Ω and 17Ω, respectively).

At the low-frequency region, information can be obtained regarding the ion transport: the extrapolation for the low-frequency data gives another x-intercept equal to $R_s+\Omega$, where Ω represents one-third of ionic resistances (Nöel et al. (2003) "Electrochemical Impedance Spectroscopy Of An Oxidized Poly(3,4-Ethylenedioxythiophene) In Propylene Carbonate Solutions," J. Electroanal. Chem. 558:41-48) in the pores for the distributed RC network of the nanoelectrode in the pore. The thus-obtained resistance values for nanotubes and nanowires are 6Ω and 170Ω, respectively. Almost pure capacitive behavior in nanotubes is manifested by this low internal resistance. The abnormally large ionic resistance in nanowires is related to the slow ion diffusion into the dense, rigid nanowires. The knee frequency for the nanowires, at which they start to behave like a capacitor, is about 0.1 Hz. This suggests that nanowires in the template are not suitable for a high power supercapacitor which requires a fast charge/discharge response.

From the impedance curve (FIG. 19), the specific capacitances of the nanotubes and nanowires can be calculated by:

$$C_{spec} = \frac{1}{2\pi f m_e Z_{Im}} \qquad \text{Equation 6}$$

where f and $Z_{Im}$ are the frequency in Hz and the imaginary part of impedance in ohms, respectively. The calculated specific capacitances for NT 500 and NW500 at low frequency (11.8 mHz) are 144 and 133 F g$^{-1}$, respectively. The $C_{spec}$ value for NT 500 is in good agreement with that from the galvanostatic study (132 F g$^{-1}$ in FIG. 14). On the other hand, the value of $C_{spec}$ for NW 500 is much higher than the value (50 F g$^{-1}$) in FIG. 18. This means that NW500 can be operated with almost full use of its capacitance at low frequency. As the frequency is increased to 1 Hz, the calculated $C_{spec}$ of NT 500 remains as high as 126 F g$^{-1}$, while the $C_{spec}$ of NW 500 drops dramatically to 30 F g$^{-1}$. At the much higher frequency of 1000 Hz, both nanotubes and nanowires suffer from insufficient counter-ion diffusion, and the calculated $C_{spec}$ values for NT 500 and NW 500 drop significantly, to 26 and 6 F g$^{-1}$, respectively.

Conclusion: The data demonstrates that the nanotubular structures of the present invention can dramatically improve electrochemical performance in a PEDOT-based supercapacitor. The thin-walled nanotubes provided short diffusion paths and low ionic resistance for the diffusion of counter-ions to make all PEDOT available during complete charge/discharge even at a fast scan rate. This fast electrochemical reaction enables one to achieve high power density without much loss of energy density (specific capacitance), which is the basic requirement for a supercapacitor to meet the demand of modern instruments on high peak power. The electrochemical performance of nanotube-based supercapacitors can be further improved by optimizing the electrolytes, electrode materials, and cell design. The invention thus finds particular use and application in nanotube-based organic electronic devices which require fast charge/discharge processes, such as batteries, electrochromic displays, sensors, and actuators. The invention may be employed in any of a variety of applications, including as a capacitor or supercapacitor (e.g. to power a vehicle such as a passenger car, truck and the like; to power a communication instrument particularly a portable mobile communication instrument; to power a memory backup of a computer; to power military and/or aerospace equipment; to power medical equipment, etc.).

In sum, the fast charging/discharging capability of poly(3, 4-ethylenedioxythiophene) (PEDOT) nanotubes during the redox process can be used to provide a high-powered supercapacitor. PEDOT nanotubes were electrochemically synthesized in a porous alumina membrane, and their structures were characterized using electron microscopes. Cyclic voltammetry was used to characterize the specific capacitance of the PEDOT nanotubes at various scan rates. A type I supercapacitor (two symmetric electrodes) based on PEDOT nanotube electrodes was fabricated, and its energy density and power density were evaluated by galvanostatic charge/discharge cycles at various current densities. The data showed that such PEDOT-nanotube-based supercapacitors can achieve a high power density of at least 25 kW kg$^{-1}$ while maintaining at least 80% energy density (5.6 Wh kg$^{-1}$). This high power capability is attributed to the fast charge/discharge of nanotubular structures: hollow nanotubes allow counter-ions to readily penetrate into the polymer and access their internal surfaces, while the thin wall provides a short diffusion distance to facilitate the ion transport. Impedance spectroscopy showed that the nanotubes exhibited much lower diffusional resistance to charging ions than solid nanowires shielded by an alumina template, providing additional support for the above stated conclusions relating to the high charging/discharging efficiency of the nanotubular structures of the present invention.

All publications and patents mentioned in this specification are herein incorporated by reference to the same extent as if each individual publication or patent application was specifically and individually indicated to be incorporated by reference in its entirety. While the invention has been described in connection with exemplary implementations thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A method for producing an electrochemically active coaxial nanowire, which method comprises contacting a substrate with a composition comprising:
   (A) ions of a transition metal; and
   (B) an electropolymerizable organic compound;
   under conditions sufficient to cause:
   (ii) said ions of said transition metal to oxidize to a metal oxide forming a core of said coaxial nanowire; and
   (ii) said electropolymerizable organic compound to polymerize into an electropolymerized organic compound forming a shell axially surrounding said core.

2. The method of claim 1, wherein said transition metal is selected from the group consisting of Ac, Ag, Au, Cd, Ce, Co, Cr, Cu, Dy, Er, Eu, Fe, Gd, Hf, Hg, Ho, Ir, La, Lu, Mn, Mo, Nb, Nd, Ni, Os, Pd, Pr, Pt, Re, Rh, Ru, Sc, Sm, Ta, Tb, Tc, Th, Ti, Tm, U, V, W, Y, Yb, Zn and Zr.

3. The method of claim 2, wherein said transition metal is selected from the group consisting of Ag, Ce, Co, Cr, Cu, Fe, La, Mn, Mo, Nb, Nd, Ni, Ru, Ta, Ti, V, W, Zn and Zr.

4. The method of claim 2, wherein said transition metal is Mn.

5. The method of claim 1, wherein said electropolymerized organic compound is PEDOT or a derivative or position isomer thereof.

6. The method of claim 4, wherein said electropolymerized organic compound is PEDOT.

7. The method of claim 1, wherein said substrate comprises an electrode and a porous film or membrane, and said metal oxide is in electrical contact with said electrode.

8. The method of claim 1, wherein said substrate comprises an alumina or polymer template that guides said forming a core of said coaxial nanowire or said forming a shell axially surrounding said core.

9. The method of claim 1, wherein said conditions comprise application of a voltage potential to said substrate, said voltage potential being from about 0.6 V to about 0.85 V, as determined using an Ag/AgCl electrode.

10. The method of claim 1, wherein said transition metal is Mn, said electropolymerized organic compound is PEDOT or a derivative or position isomer thereof, and said conditions comprise application of a voltage potential to said substrate, said voltage potential being from about 0.6 V to about 0.85 V, as determined using an Ag/AgCl electrode.

11. The method of claim 1, wherein said metal oxide and said electropolymerized organic compound are coelectrodeposited on said substrate.

12. The method of claim 10, wherein said voltage potential is about 0.75 V.

\* \* \* \* \*